(12) United States Patent
Bao

(10) Patent No.: US 10,601,969 B2
(45) Date of Patent: Mar. 24, 2020

(54) MOBILE ELECTRONIC DEVICE AND MOBILE PHONE

(71) Applicant: GUANGDONG OPPO MOBILE TELECOMMUNICATIONS CORP., LTD., Dongguan (CN)

(72) Inventor: Xiaoming Bao, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/956,607

(22) Filed: Apr. 18, 2018

(65) Prior Publication Data
US 2019/0014201 A1    Jan. 10, 2019

(30) Foreign Application Priority Data

Apr. 28, 2017   (CN) .......................... 2017 1 0296589

(51) Int. Cl.
*H04M 1/02*  (2006.01)
*H04N 5/225* (2006.01)
(Continued)

(52) U.S. Cl.
CPC ....... *H04M 1/0264* (2013.01); *H04M 1/0235* (2013.01); *H04N 5/2257* (2013.01);
(Continued)

(58) Field of Classification Search
CPC ............. H04M 1/0235; H04M 1/0264; H04M 1/72583; H04M 2250/20; H04N 5/2257; H04N 5/23238
See application file for complete search history.

(56) References Cited

U.S. PATENT DOCUMENTS

2007/0279481 A1* 12/2007 Chambers .............. H04N 5/232
348/14.01
2010/0304799 A1* 12/2010 Leung ................. H04M 1/0214
455/575.3
(Continued)

FOREIGN PATENT DOCUMENTS

CN       2653813    11/2004
CN       2666053    12/2004
(Continued)

OTHER PUBLICATIONS

SIPO, First Office Action for CN Application No. 201710296589, dated Feb. 2, 2019.
(Continued)

*Primary Examiner* — Jaime M Holliday
(74) *Attorney, Agent, or Firm* — Hodgson Russ LLP

(57) ABSTRACT

The present disclosure relates to a mobile electronic device, which includes a body, a display screen disposed to an obverse surface of the body, an input-output module, and a drive assembly coupled to the input-output module. The display screen is able to display a start tag and a mode tag. The input-output module includes a base and a camera disposed to the base, and the input-output module is able to be at least partially accommodated in the body. The drive assembly is configured to drive the input-output module to be exposed from an end portion of the body in accordance with a user input signal for the start tag, and is configured to drive the input-output module to rotate in accordance with a user input for the mode tag. A mobile phone is also provided.

20 Claims, 20 Drawing Sheets

(51) Int. Cl.
*H04N 5/232* (2006.01)
*H04M 1/725* (2006.01)

(52) U.S. Cl.
CPC .... *H04N 5/23238* (2013.01); *H04M 1/72583* (2013.01); *H04M 2250/20* (2013.01)

(56) References Cited

U.S. PATENT DOCUMENTS

| | | | | |
|---|---|---|---|---|
| 2015/0189175 | A1* | 7/2015 | Fan | H04N 5/2251 348/37 |
| 2015/0281525 | A1 | 10/2015 | Thakur | |
| 2016/0316046 | A1* | 10/2016 | Zheng | H04M 1/0264 |
| 2017/0126937 | A1* | 5/2017 | Evans | H04N 5/2252 |
| 2017/0244903 | A1* | 8/2017 | Yang | H04N 5/2257 |

FOREIGN PATENT DOCUMENTS

| | | |
|---|---|---|
| CN | 1585412 | 2/2005 |
| CN | 101086611 | 12/2007 |
| CN | 202998216 | 6/2013 |
| CN | 203984539 | 12/2014 |
| CN | 204031223 | 12/2014 |
| CN | 105554196 | 5/2016 |
| CN | 205490854 | 8/2016 |
| CN | 106572214 | 4/2017 |
| CN | 106899721 | 6/2017 |
| CN | 107343064 | 11/2017 |
| CN | 107864242 | 3/2018 |
| JP | 2002141990 | 5/2002 |
| JP | 3721133 | 11/2005 |

OTHER PUBLICATIONS

EPO, Office Action for EP Application No. 18169792, dated Jul. 31, 2018.

WIPO, English translation of the ISR/WO for PCT/CN2018/084684, dated Jul. 16, 2018.

SIPO, Fourth Office Action for CN Application No. 201710296589.8, dated Nov. 22, 2019.

* cited by examiner

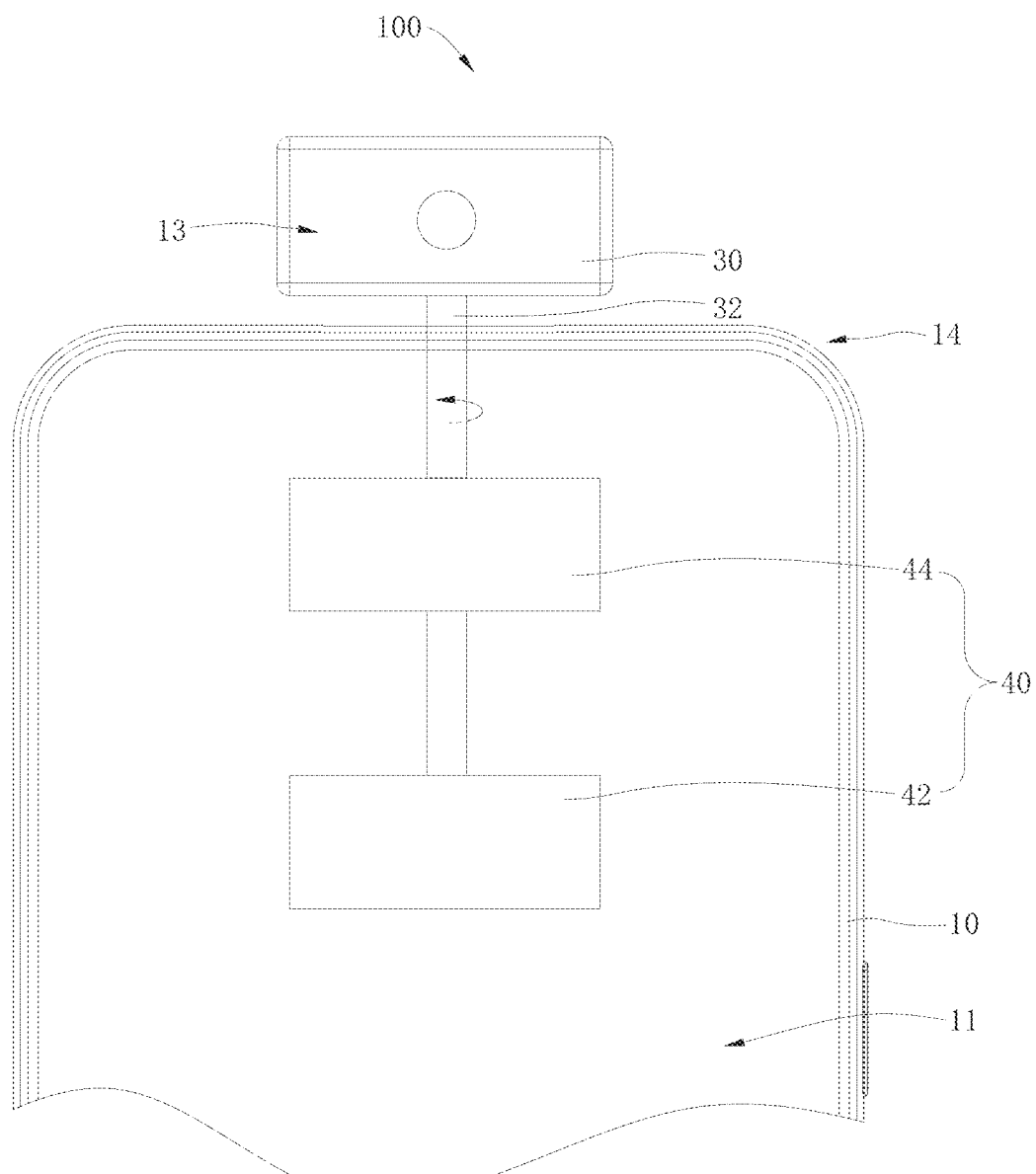
Fig. 11
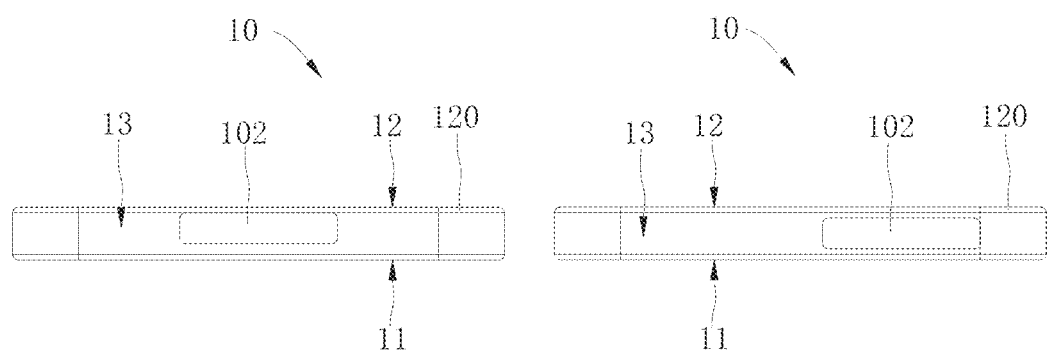
Fig. 12
Fig. 13

MOBILE ELECTRONIC DEVICE AND MOBILE PHONE

CROSS-REFERENCE TO RELATED APPLICATION

This application claims priority to and benefits of Chinese Patent Application Serial No. 201710296589.8, filed with the State Intellectual Property Office of P. R. China on Apr. 28, 2017, the entire content of which is incorporated herein by reference.

FIELD

The present disclosure relates to a technical field of electronic devices, particularly to a mobile electronic device and a mobile phone.

BACKGROUND

With the development of technologies, an electronic device with a display screen assembly is used more widely and has more functions, which has become a requisite electronic apparatus in people's daily life. The display screen assembly of the typical electronic device typically has a low screen-to-body ratio.

SUMMARY

Embodiments of the present disclosure are to provide an electronic device.

The mobile electronic device of the embodiments of the present disclosure includes: a body; a display screen, disposed to a first surface of the body and being able to display a start tag and a mode tag; an input-output module, including a base and a camera disposed to the base, and being able to be at least partially accommodated in the body; and a drive assembly, coupled to the input-output module, configured to drive the input-output module to be exposed from an end portion of the body in accordance with a user input signal for the start tag, and configured to drive the input-output module to rotate in accordance with a user input for the mode tag.

Embodiments of the present disclosure are to further provide another mobile electronic device.

The another mobile electronic device of the embodiments of the present disclosure includes: a body, an end portion of the body defining a groove; an input-output module, including a base, a rotating shaft disposed to the base, and a camera disposed to the base, and being able to be at least partially accommodated in the body; and a drive assembly, disposed in the body, coupled to the input-output module, and configured to drive the input-output module to be exposed from the end portion of the body through the groove, and configured to drive the rotating shaft to drive the input-output module to rotate.

Embodiments of the present disclosure are to further provide a mobile phone.

The mobile phone of the embodiments of the present disclosure includes: a body; a display screen coupled to the body; and an input-output module, including a base, a camera and a receiver with electroacoustic transform function, the camera and the receiver being coupled to the base, the input-output module being movable relative to the body to make the mobile phone transformable between a first configuration and a second configuration, in the first configuration, the receiver and the camera being exposed out of the body and extending beyond the display screen, and the camera being rotatable relative to the body to face different directions, in the second configuration, the camera being received in the body and covered by the display screen.

Additional aspects and advantages of embodiments of the present disclosure will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present disclosure will become apparent and more readily appreciated from the following descriptions made with reference to the drawings, in which:

FIGS. 10 and 11 are plan views of a mobile electronic device according to some embodiments of the present disclosure.

FIGS. 12 to 15 are plan views of a body according to some embodiments of the present disclosure.

DETAILED DESCRIPTION

Figure 1:
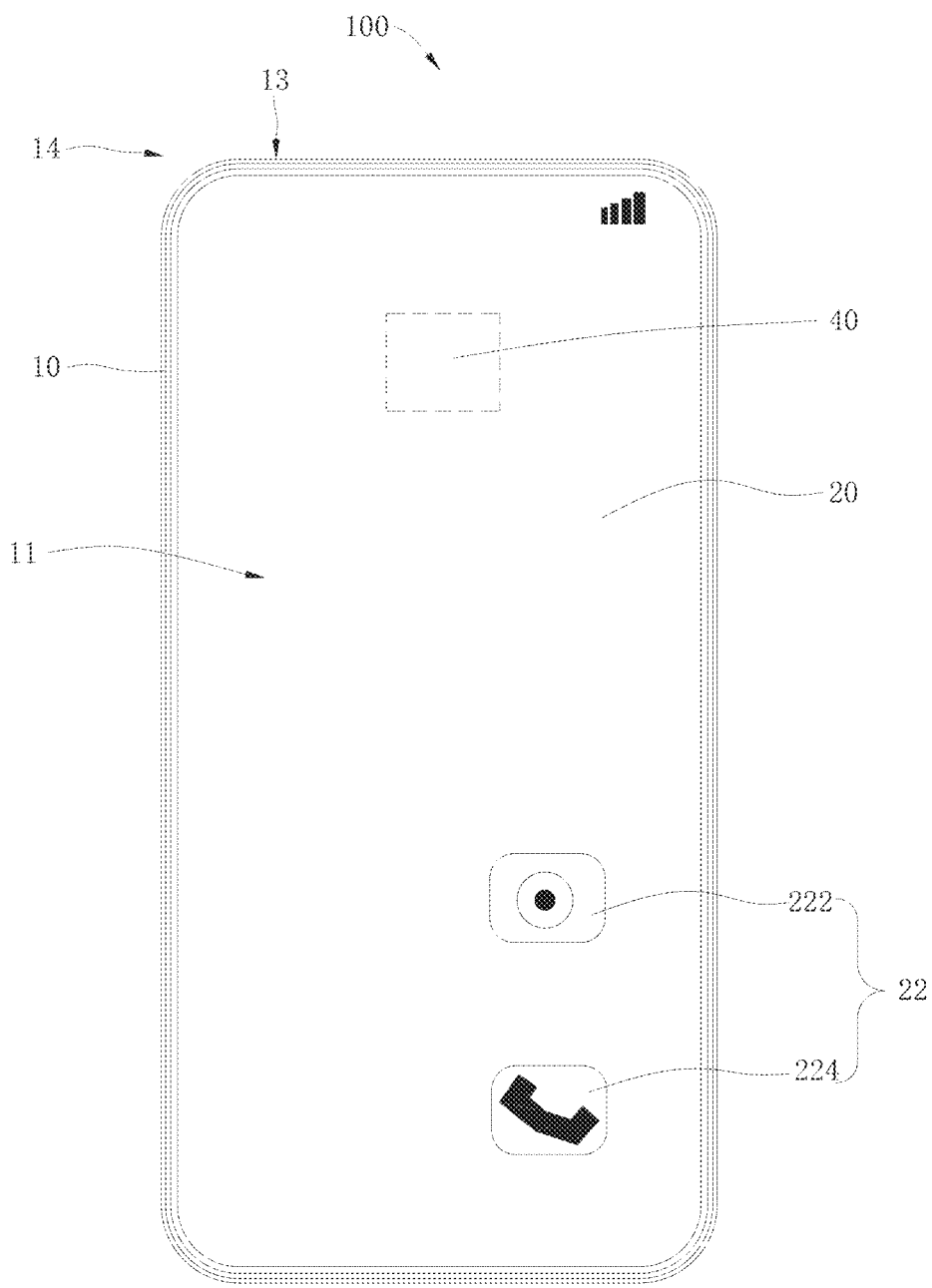
FIGS. 1 to 3 are plan views of a mobile electronic device according to some embodiments of the present disclosure.

Specific embodiments of the present disclosure will be described further with reference to accompanying drawings. The same or similar reference numerals are used to indicate same or similar members or members with same or similar functions throughout the description.

Additionally, the embodiments of the present disclosure described herein with reference to drawings are explanatory, illustrative, and used to generally understand the present disclosure. The embodiments shall not be construed to limit the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," or "above" a second feature may include an embodiment in which the first feature is right or obliquely "on," or "above" the second feature, or just means that the first feature is at a height higher than that of the second feature. While a first feature "below," or "under" a second feature may include an embodiment in which the first feature is right or obliquely "below," or "under" the second feature, or just means that the first feature is at a height lower than that of the second feature.

Reference throughout this specification to "certain embodiments" "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

Figure 2:
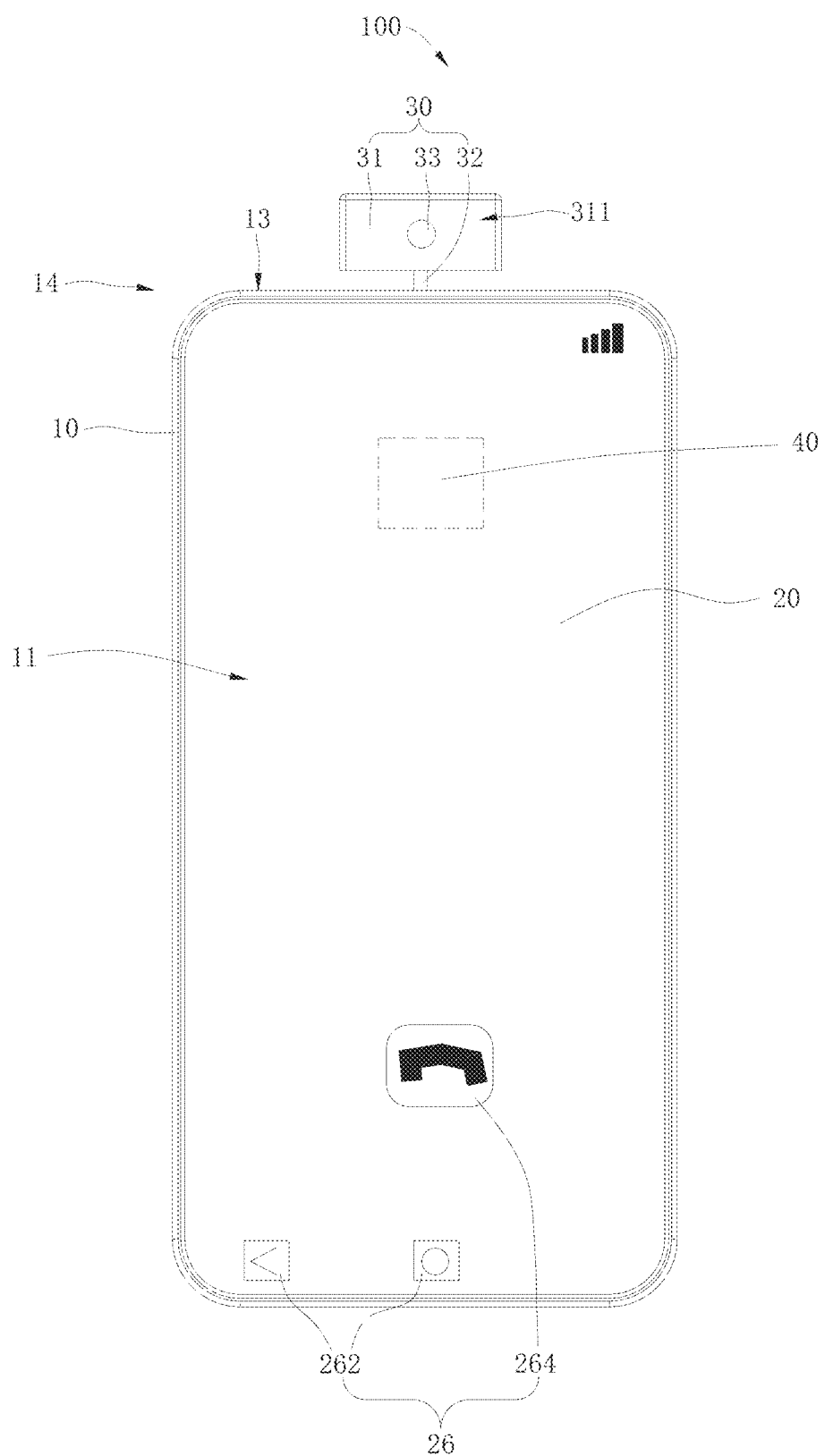
Figure 5:
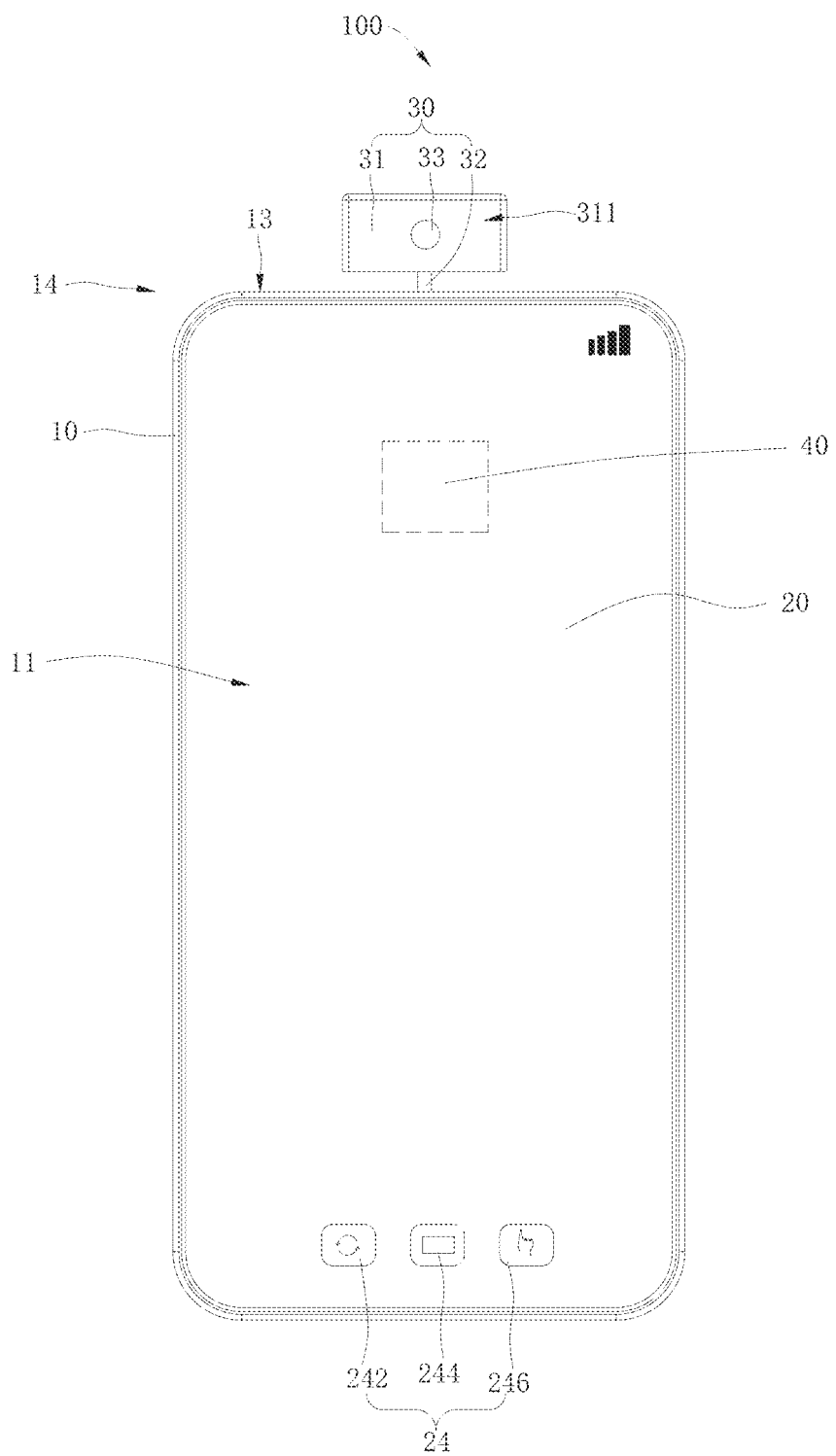
FIG. 5 is a plan view of a mobile electronic device according to some embodiments of the present disclosure.

Referring to FIGS. 1-2 and 5, a mobile electronic device according to embodiments of the present disclosure includes a body 10, a display screen 20, an input-output module 30 and a drive assembly 40.

The body 10 includes a first surface, and a second surface opposite to the first surface, and a third surface coupling the first surface and the second surface. The first surface may be configured as one of an obverse surface 11 and a back surface 12 of the body 10, and the second surface may be configured as the other of the obverse surface 11 and the back surface 12 of the body 10. The third surface may be configured as one of a top surface 13, a bottom surface, a right side surface, and a left side surface of the body 10, and third surface is usually perpendicular to the first surface and the second surface. In embodiments of the present disclosures, the first surface exemplified as the obverse surface 11, the second surface is exemplified as the back surface 12, and the third surface is exemplified as the top surface 13.

The display screen 20 is disposed to the obverse surface 11 of the body 10, and the display screen 20 can display a start tag 22 and a mode tag 24. The input-output module 30 includes a base 31 and a camera 33 disposed to the base 31, and the input-output module 30 can be at least partially accommodated in the body 10. The drive assembly 40 is coupled to the input-output module 30, and the drive assembly 40 is configured to drive the input-output module 30 to be exposed from an end portion 14 of the body 10 in accordance with a user input signal for the start tag 22, and configured to drive the input-output module 30 to rotate in accordance with a user input for the mode tag 24. It could be understood that, the end portion 14 of the input-output module 30 may be configured as a top, a bottom, a left side, or a right side of the body 10, which is not limited by the present disclosure. Furthermore, in some embodiments, the display screen 20 may also be disposed to each of the obverse surface 11 and the back surface 12 of the body 10 at the same time.

Additionally, it should be noted that, various tags mentioned in embodiments of the present disclosure may be displayed as one tag on the display screen 20, or may be displayed as a plurality of tags on the same position of the display screen 20, and these display configurations can be switched by tapping, pressing, or swiping the tag during use.

The input-output module 30 may be disposed to the end portion 14 of the body 10, and the input-output module 30 and the obverse surface 11 of the body 10 are staggered with each other. That is to say, the input-output module 30 is not disposed on the obverse surface 11 of the body 10. In the mobile electronic device 100 according to embodiments of the present disclosure, by providing the camera 33 to the input-output module 30 and providing the input-output module 30 movably in the body 10 of the mobile electronic device 100, the input-output module 30 is hided in the body 10 when the camera 33 is not used, and the drive assembly 40 is used to drive the input-output module 30 to be exposed from the end portion 14 of the body 10 when the camera 33 needs to be used, such that the camera 33 does not occupy space of the display screen 20 on the premise that a shooting function is not influenced, thereby effectively increasing a screen-to-body ratio of the mobile electronic device 100. Meanwhile, when a user needs to use the camera 33 as a rear camera, the drive assembly 40 can drive the input-output module 30 to rotate, in which way, the camera 33 can be used both as a front camera and as the rear camera, thereby reducing a cost of the mobile electronic device 100.

The fact that the input-output module 30 can be at least partially accommodated in the body 10 can be understood as that the input-output module 30 may be partially accommodated in the body 10, or may also be completely accommodated in the body 10; certainly, this can also be understood as that the base 31 may be partially accommodated in the body 10, or may also be completely accommodated in the body 10.

The fact that the input-output module 30 is exposed from the end portion 14 of the body 10 may be understood as that the base 31 and the camera 33 disposed on the base 31 both are completely exposed outside the body 10; certainly, this may also be understood as that the base 31 is partially exposed outside the body 10, and the camera 33 is completely exposed outside the body 10.

Figure 3:
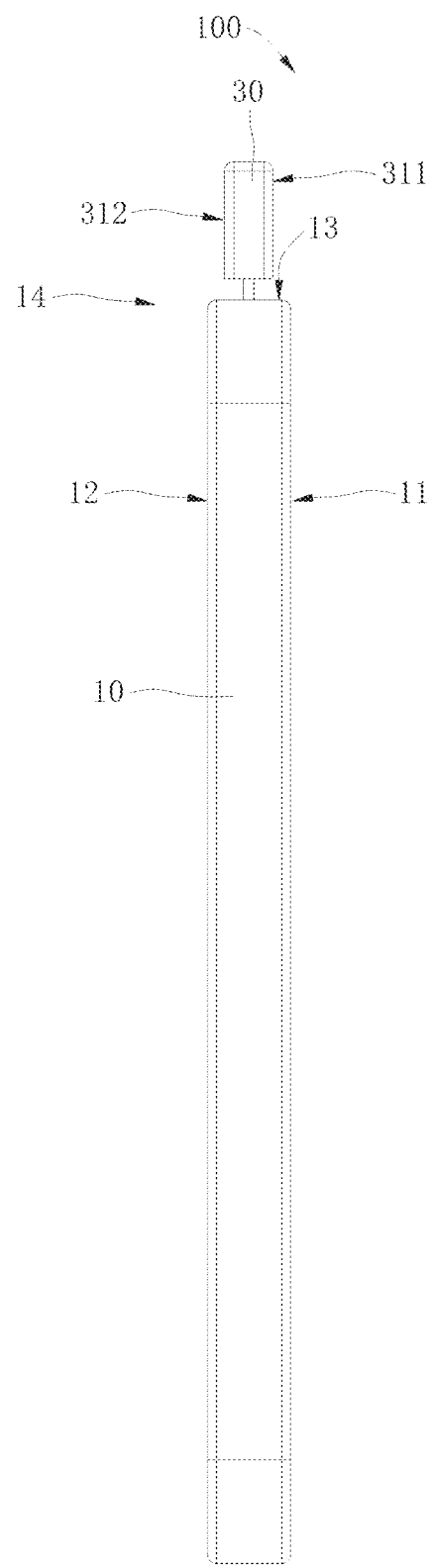

Referring to FIGS. 1 to 3, the mobile electronic device 100 according to embodiments of the present disclosure includes the body 10, the display screen 20, the input-output module 30 and the drive assembly 40. The mobile electronic device 100 can include but is not limited to a mobile phone, a tablet computer, a smartwatch and the like. In the present embodiment, the mobile electronic device 100 is exemplified as the mobile phone.

Figure 4:
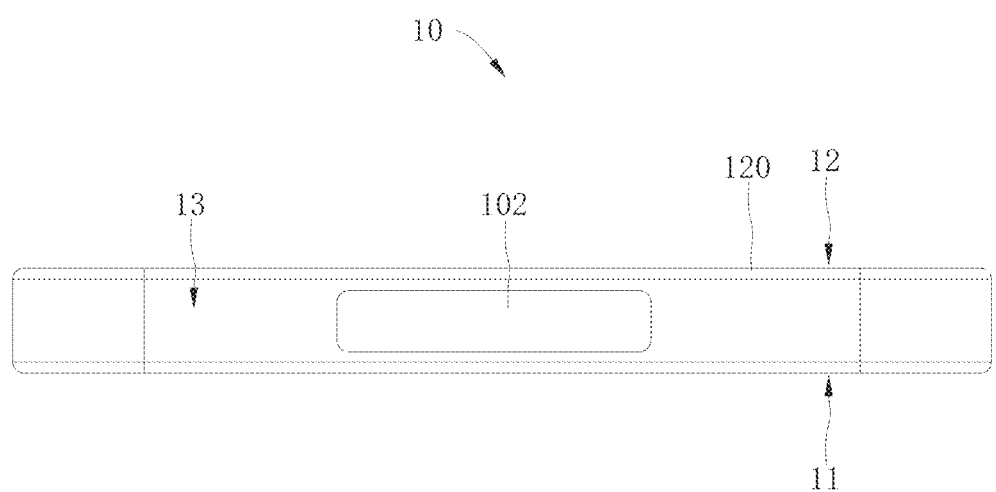
FIG. 4 is a plan view of a body according to some embodiments of the present disclosure.

Referring to FIG. 4, the body 10 includes the obverse surface 11, the back surface 12 opposite to the obverse surface 11, and a top surface 13 coupling the obverse surface 11 and the back surface 13. The top surface 13 is located on the end portion 14 of the body 10, that is, in the present embodiment, the end portion 14 of the body 10 is exemplified as the top of the body 10, the top surface 13 defines a groove 102, and a section of the groove 12 taken by a plane parallel to the top surface 13 is rectangular. In embodiments of the present disclosure, the body 10 is in a rectangular block shape, and the groove 102 is located at a center position of the top surface 13 and has a rectangular section.

Referring to FIGS. 1-2 and 5, the display screen 20 is disposed to the obverse surface 11 of the body 10, and the display screen 20 can display the start tag 22, the mode tag 24 and a close tag 26. In embodiments of the present disclosure, the start tag 22 is a camera start tag 222, the mode tag 24 includes a camera switch tag 242 and a panoramic camera tag 244, and the close tag 26 is a camera close tag 262. In embodiments of the present disclosure, the display screen 20 is entirely in a rectangular shape, and the shape and size of the display screen 20 is substantially consistent with the shape and size of the obverse surface 11. In some embodiments, the display screen 20 is entirely in a rounded rectangular shape, i.e. a shape formed by replacing four straight corners of a rectangle with rounded corners.

Referring to FIG. 1, the shape of the input-output module 30 is consistent with the shape of the groove 102, and the size of the input-output module 30 is smaller than or equal to the size of the groove 102, such that the input-output module 30 can be completely accommodated in the groove 102. In other embodiments, the size of the input-output module 30 may be partially greater than the size of the groove 102, such that the input-output module 30 can be partially accommodated in the groove 102. The input-output module 30 includes the base 31, a rotating shaft 32 disposed to the base 31, and the camera 33 disposed on the base 31.

Figure 6:
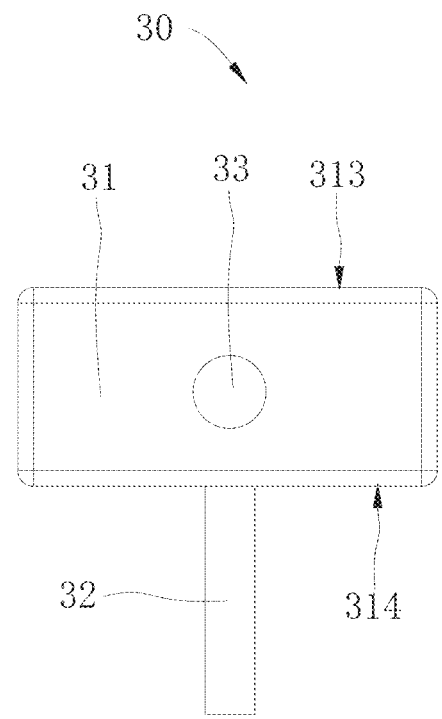
FIGS. 6 to 9 are plan views of an input-output module according to some embodiments of the present disclosure.

Referring to FIGS. 2-3 and 6, the base 31 includes a front surface 311, a rear surface 312, an upper surface 313 and a lower surface 314 that are opposite each other correspondingly. The front surface 311 and the obverse surface 11 face the same side of the body 10, the rear surface 312 and the back surface 12 face the same other side of the body 10, the upper surface 313 and the top surface 13 face the same side of the body 10, and the lower surface 314 faces away from the upper surface 313.

The rotating shaft 32 is disposed to the lower surface 314 of the base 31, and the rotating shaft 32 has a circular section. The rotating shaft 32 is configured to drive the input-output module 30 to rotate. In other embodiments, the section of the rotating shaft 32 may be a square, a triangle, an ellipse, a regular polygon or other regular shapes, and may also be an irregular polygon shape or the like.

Figure 7:
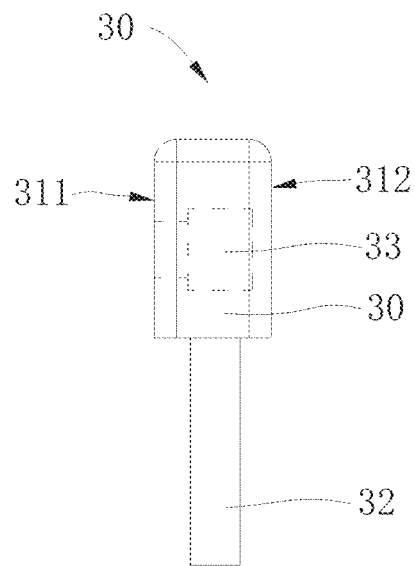
Figure 8:
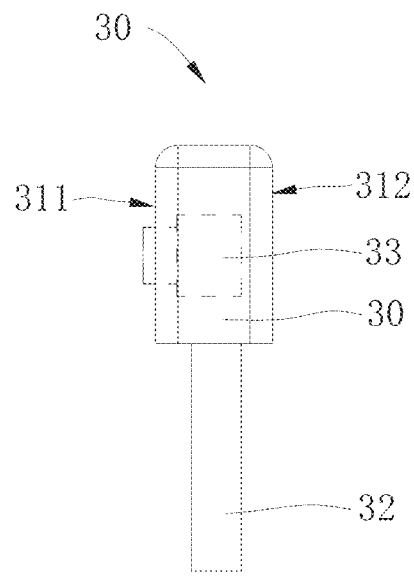
Figure 9:
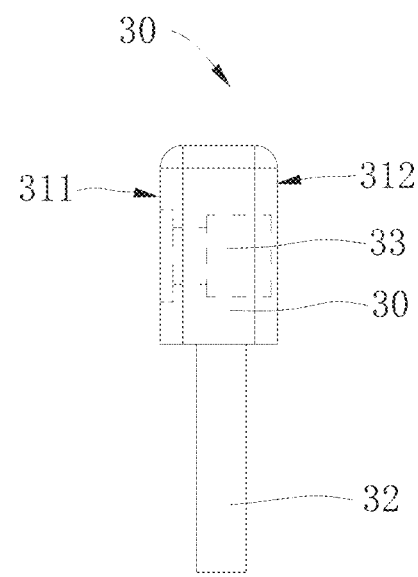

Referring to FIGS. 6 to 9, in the present embodiment, the camera 33 is located at a center position of the front surface 311, that is to say, the camera 33 is set as the front camera by default. Certainly, the position of the camera 33 on the front surface 311 is not limited to the form discussed above, for example, the camera 33 may be located at an upper center position of the front surface 311; or the camera 33 may be close to either side edge of the front surface 311; or the camera 33 may be located at any position of the front surface 311, which will be not described in detail herein. In addition, viewing from a perspective of FIG. 3, an end surface of the camera 33 is flush with the front surface 311 (as illustrated in FIG. 7). Certainly, the camera 33 may also not be limited to the structure discussed above, and in other embodiments, the end surface of the camera 33 is protruding relative to the front surface 311 (as illustrated in FIG. 8) or recessed from the front surface 311 (as illustrated in FIG. 9). Alternatively, the end surface of the camera 33 is flush with the front surface 311 or recessed from the front surface 311 when the camera 33 is in an initial state, and the end surface of the camera 33 is protruding relative to the front surface 311 or is flush with the front surface 311 when the camera 33 is zooming or focusing.

Figure 10:
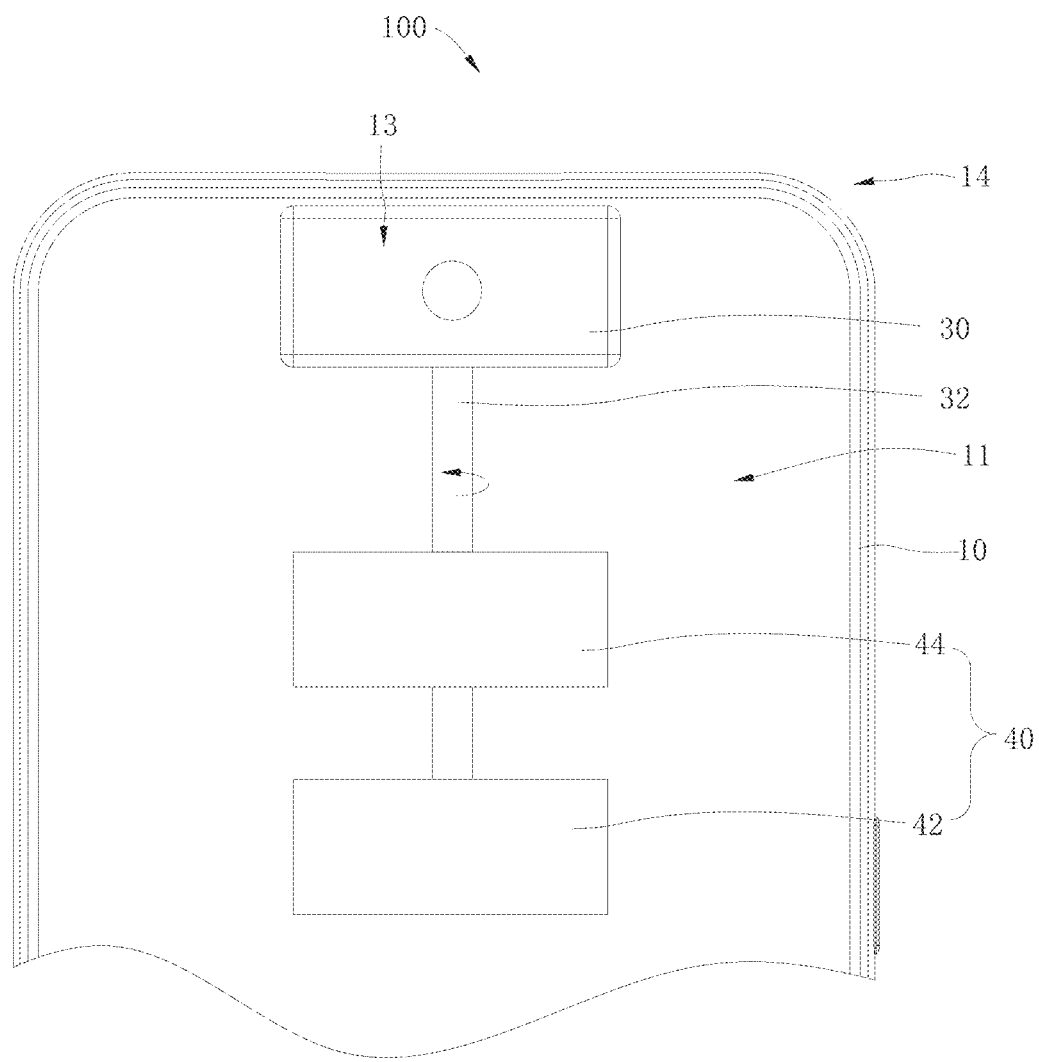

Referring to FIGS. 5 and 10, the drive assembly 40 is disposed in the body 10. The drive assembly 40 includes a linear driving member 42 and a rotary driving member 44, the linear driving member 42 may include a linear motor, and the rotary driving member 44 may include a rotary motor. The linear motor 42 (the linear driving member 42) is coupled to the rotary motor 44 (the rotary driving member 44), and the rotary motor 44 (the rotary driving member 44) is coupled to the rotating shaft 32. For example, a mover of the linear motor 42 is fixedly coupled to a stator of the rotary motor 44, and a mover of the rotary motor 44 is fixedly coupled to the rotating shaft 32. The linear motor 42 is configured to control the rotary motor 44 to move linearly together with the input-output module 30, such that the input-output module 30 is exposed from the end portion 14 of the body 10. The rotary motor 44 is configured to drive the rotating shaft 32 to rotate so as to drive the input-output module 30 to rotate, after the input-output module 30 is exposed from the end portion 14 of the body 10. Specifically, the mover of the linear motor 42 stretches to drive the rotary motor 44 and the input-output module 30 to stretch until the input-output module 30 is completely exposed from the end portion 14 of the body 10, and then the mover of the rotary motor 44 rotates to drive the input-output module 30 to rotate.

Referring to FIGS. 10 and 11, the drive assembly 40 (the linear driving member 42) can drive the input-output module 30 to slide along the groove 102 in accordance with a user input signal for the camera start tag 222 displayed on the display screen 20, such that the input-output module 30 is exposed from the end portion 14 of the body 10. Specifically, the mover of the linear motor 42 stretches to drive the rotary motor 44 and the input-output module 30 together to stretch until the input-output module 30 is completely exposed from the end portion 14 of the body 10.

The drive assembly 40 (the rotary driving member 44) also can drive the input-output module 30 to rotate by 180 degrees in accordance with a user input signal for the camera switch tag 242, such that the camera 33 can be used as the rear camera. Specifically, the mover of the rotary motor 44 can rotate to drive the input-output module 30 to rotate by 180 degrees, after the input-output module 30 is exposed from the end portion 14 of the body 10.

The drive assembly 40 (the rotary driving member 44) can also drive the rotating shaft 32 to drive the input-output module 30 to rotate continuously in accordance with a user input signal for the panoramic camera tag 244, such that the camera 33 can shoot continuously in a plurality of directions, i.e. the camera 33 can shoot a panoramic photo. Specifically, the mover of the rotary motor 44 can rotate continuously to drive the input-output module 30 to rotate continuously, after the input-output module 30 is completely exposed from the end portion 14 of the body 10. Correspondingly, the camera 33 can continuously shoot in the plurality of directions so as to obtain the panoramic photo.

The drive assembly 40 (the linear driving member 42, or the linear driving member 42 and the rotary driving member 44 together) can drive the input-output module 30 to slide along the groove 102 in accordance with a user input signal for the camera close tag 262 so as to hide the input-output module 30 into the body 10. Specifically, when the input-output module 30 is aligned with the groove 102, the mover of the linear motor 42 is retracted to drive the rotary motor 44 and the input-output module 30 to retract until the input-output module 30 is completely accommodated back into the groove 102; when the input-output module 30 is not aligned with but is at a certain included angle with the groove 102, the mover of the rotary motor 44 first rotates to drive the input-output module 30 to rotate until the input-output module 30 is aligned with the groove 102, and then the mover of the linear motor 42 is retracted to drive the rotary motor 44 and the input-output module 30 to retract until the input-output module 30 is completely accommodated back into the groove 102.

Referring to FIGS. 1-2 and 5, the camera start tag 222 may be an icon of a camera application, and when the user taps the icon of the camera application, the driver assembly 40 drives the input-output module 30 to slide along the groove 102, such that the input-output module 30 can be exposed from the end portion 14 of the body 10. The camera switch tag 242 may be a rear camera switch tag of the camera application, and when the user taps an icon of the camera switch tag 242, the drive assembly 40 drives the input-output module 30 to rotate by 180 degrees, such that the camera 33 can be used as the rear camera. The panoramic camera tag 244 may be a panoramic shooting mode tag of the camera application, and when the user taps the icon of the panoramic camera tag 244, the drive assembly 40 drives the input-output module 30 to rotate continuously, such that the camera 33 can continuously shoot in the plurality of directions. The camera close tag 262 may be a return key of the camera application or a close key of the mobile electronic device 100 for closing or exiting the application, and when the user taps the return key or the close key, the drive assembly 40 drives the input-output module 30 to hide into the body 10. When the camera 33 is the front camera, the drive assembly 40 drives the input-output module 30 to directly slide into the groove 102. When the camera 33 is the rear camera, the drive assembly 40 first drives the input-output module 30 to rotate by 180 degrees to make the camera 33 become the front camera, and then the drive assembly 40 drives the input-output module 30 to slide into the groove 102.

When the mobile electronic device 100 is in an initial state, the input-output module 30 is hided in the body 10; when the user needs to use the camera 33, the user taps the camera start tag 222, and hence the drive assembly 40 drives the input-output module 30 to slide along the groove 102, such that the input-output module 30 is exposed from the end portion 14 of the body 10 (as illustrated in FIG. 2, the camera 33 is also exposed from the end portion 14 of the body 10); when the user needs to use the camera 33 as the rear camera, the user taps the camera switch tag 242, and the drive assembly 40 drives the input-output module 30 to rotate by 180 degrees; when the user needs to perform panoramic shooting, the user taps the panoramic camera tag 244, and the drive assembly 40 drive the input-output module 30 to rotate continuously, such that the camera 33 can continuously shoot in the plurality of directions; after finishing the use of the camera 33, the user taps the camera close tag 262, and the drive assembly 40 drives the input-output module 30 to slide along the groove 102, such that the input-output module 30 is again hided in the body 10 (as illustrated in FIG. 1, the camera 33 is also again hided in the body 10).

When a part of the base 31 located in the body 10 rotates, if the part of the base 31 located in the body 10 does not interfere with the body 10, the base 31 does not need to be completely exposed outside the body 10, and the drive assembly 40 can control the input-output module 30 to rotate. When the part of the base 31 located in the body 10 rotates, if the part of the base 31 located in the body 10 interferes with the body 10, the base 31 needs to be completely exposed outside the body 31, such that the drive assembly 40 can control the input-output module 30 to rotate.

Referring to FIG. 5, the mode tag 24 may further include a manual control tag 246, and the drive assembly 40 (the rotary driving member 44) also can drive the rotating shaft 32 to drive the input-output module 30 to rotate at any angle in accordance with a user input signal for the manual control tag 246, such that the camera 33 can shoot pictures in the plurality of directions. Specifically, the mover of the rotary motor 44 can rotate to drive the input-output module 30 to rotate at any angle after the input-output module 30 is exposed from the end portion 14 of the body 10. For example, the user can control the input-output module 30 to rotate by 15 degrees, 30 degrees, 45 degrees, 60 degrees, 75 degrees, 90 degrees, 105 degrees, 120 degrees, 135 degrees, 150 degrees, 165 degrees, 180 degrees, 195 degrees, 210 degrees, 225 degrees, 240 degrees, 255 degrees, 270 degrees, 285 degrees, 305 degrees, degrees, 335 degrees, 350 degrees, 365 degrees, or 380 degrees.

In the mobile electronic device 100 according to embodiments of the present disclosure, by providing the camera 33 to the input-output module 30 and providing the input-output module 30 movably in the body 10 of the mobile electronic device 100, the input-output module 30 is hided in the body 10 when the camera 33 is not used, and the drive assembly 40 is used to control the input-output module 30 to be exposed from the end portion 14 of the body 10 when the camera 33 needs to be used, such that the camera 33 does not occupy the space of the display screen 20 on the premise that the shooting function is not influenced, thereby effectively increasing the screen-to-body ratio of the mobile electronic device 100. Meanwhile, when the user needs to use the camera 33 as the rear camera, the drive assembly 40 can control the input-output module 30 to rotate, in which way, the camera 33 can be used both as the front camera and as the rear camera, thereby reducing the cost of the mobile electronic device 100.

The mobile electronic device 100 according to embodiments of the present disclosure further has the following advantageous effects: the drive assembly 40 controls the input-output module 30 to rotate continuously, and the rotation of the input-output module 30 and the continuous shooting of the camera 33 in the plurality of directions are synchronized, such that compared with continuous shooting realized by the turning of the user, the method provided by the present disclosure can reduce the vibration of the camera 33, thereby improving the quality of the picture obtained by the panoramic shooting.

Figure 14:
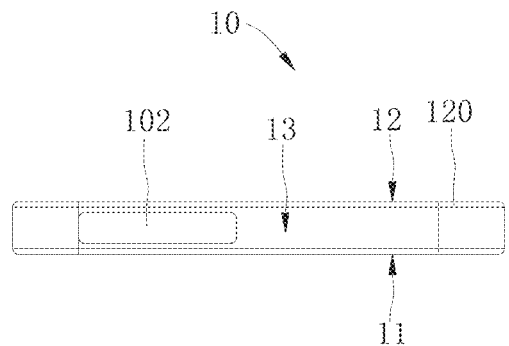
Figure 15:
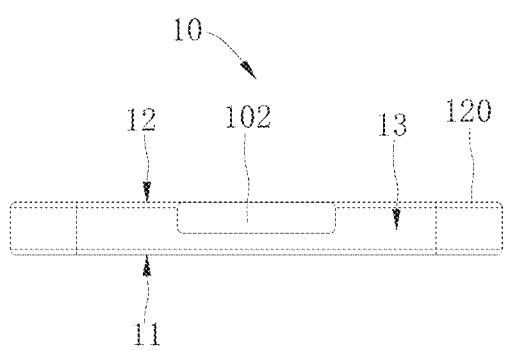

In some embodiments, the position and shape of the groove 102 is not limited to the form discussed above. For example, referring to FIGS. 4 and 12-15, the groove 102 may also be located at an edge position of the end portion 14. When the groove 102 is located at the edge position of the end portion 14, the groove 102 may penetrate one outer side edge of the end portion 14 (for example, the groove 102 illustrated in FIG. 15 penetrates a side edge 120 intersecting the back surface 12 with the top surface 13), and may also be the groove 102 as illustrated in FIGS. 12 to 14 that does not penetrate the outer side edge but is spaced apart from the outer side edge by a certain distance. The shape of the section of the groove 102 may be a triangle, a pentagon, a hexagon, a circle, a semi-circle or other suitable shapes. In other embodiments, the shape of the body 10 is also not limited to the form discussed above, and for example, the section of the body 10 may be a triangle, a circle, a pentagon, a hexagon, or other shapes.

In some embodiments, the camera may also be set as the rear camera by default, and the camera 33 is located at a center position of the rear surface 312. Certainly, the position of the camera 33 on the rear surface 312 may also refer to the above embodiment.

Figure 16:
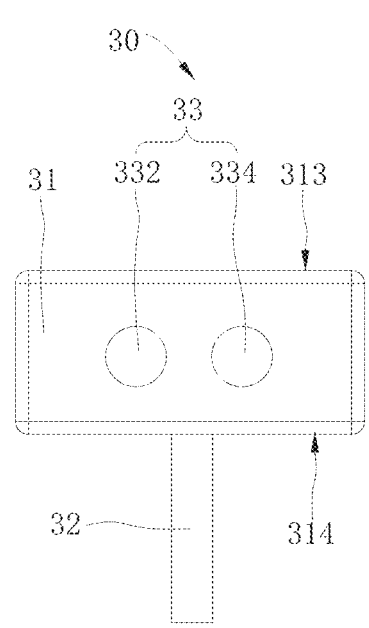
FIGS. 16 to 19 are plan views of an input-output module according to some embodiments of the present disclosure.
Figure 17:
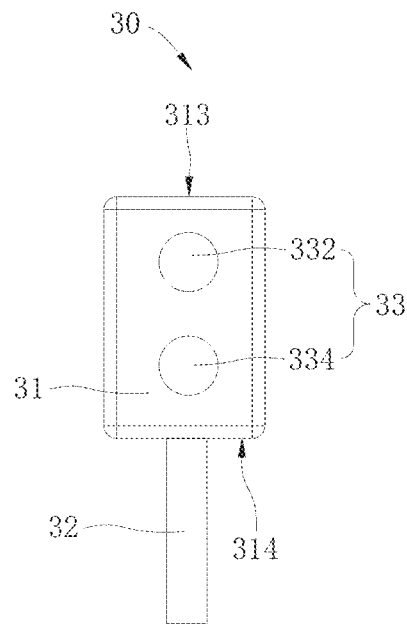

Referring to FIGS. 16 to 17, in some embodiments, the camera 33 may be a dual camera, and the camera 33 is located at a center position of the front surface 311, that is to say, the camera 33 is set as a front dual camera by default. Specifically, the camera 33 includes a first camera 332 and a second camera 334. The first camera 332 is spaced apart from the second camera 334, and an extending direction of a connecting line between a center of the first camera 332 and a center of the second camera 334 is consistent with a linear movement direction of the input-output module 30 (as illustrated in FIG. 17). In other embodiments, the extending direction of the connecting line between the center of the first camera 332 and the center of the second camera 334 is not limited to the form discussed above. For example, the extending direction of the connecting line between the center of the first camera 332 and the center of the second camera 334 is perpendicular to the linear movement direction of the input-output module 30 (as illustrated in FIG. 16), or the extending direction of the connecting line between the center of the first camera 332 and the center of the second camera 334 is at an angle with the linear movement direction of the input-output module 30. In addition, viewing from a perspective of FIG. 3, an end surface of the first camera 332 and an end surface of the second camera 334 are both flush with the front surface 311. Certainly, the first camera 332 and the second camera 334 may not be limited to the structure discussed above, either. In other embodiments, the end surface of the first camera 332 is flush with the end surface of the second camera 334, and the end surface of the first camera 332 and the end surface of the second camera 334 are both protruding relative to the front surface 311 or both recessed from the front surface 311. Alternatively, the end surface of the first camera 332 is not flush with the end surface of the second camera 334. For example, the end surface of the first camera 332 is protruding or recessed relative to the end surface of the second camera 334, and the end surface of the first camera 332 or the end surface of the second camera 334 is flush with the front surface 311. Alternatively, the end surface of the first camera 332 and the end surface of the second camera 334 are flush with the front surface 311 or recessed from the front surface 311 when the first camera 332 and the second camera 334 are in an initial state, and the end surface of the first camera 332 and the end surface of the second camera 334 are protruding relative to the front surface 311 or are flush with the front surface 311 when zooming or focusing. Certainly, the dual camera may also be disposed on the rear surface 312 by default.

Figure 18:
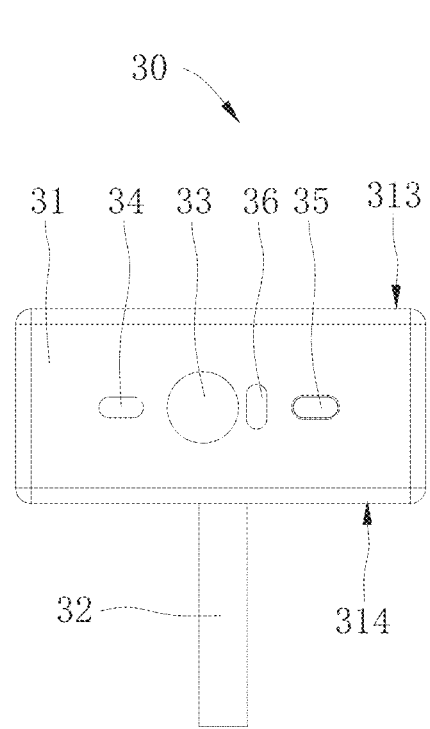
Figure 19:
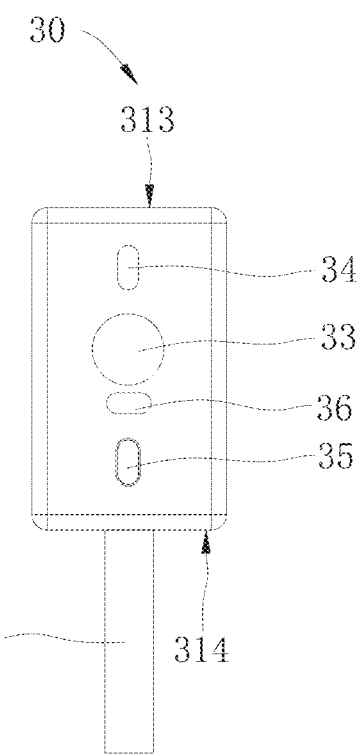

Referring to FIGS. 18 to 19, in some embodiments, the input-output module 30 according to the above embodiments may further include a receiver 34 disposed in the base 31, a light sensor 35 disposed in the base 31 and a flash lamp 36 disposed in the base 31. In the input-output module 30, the camera 33, the receiver 34, the light sensor 35 and the flash lamp 36 are spaced apart from one another. An extending direction of a connecting line of centers of the camera 33, the receiver 34, the light sensor 35 and the flash lamp 36 is perpendicular to the linear movement direction of the input-output module 30 (as illustrated in FIG. 18), and the camera 33, the receiver 34, the light sensor 35 and the flash lamp 36 are disposed at a center position of the font surface 311 of the base 31. Certainly, the layout of the camera 33, the receiver 34, the light sensor 35 and the flash lamp 36 is not limited to the form discussed above. For example, the extending direction of the connecting line of centers of the camera 33, the receiver 34, the light sensor 35 and the flash lamp 36 is consistent with the linear movement direction of the input-output module 30 (as illustrated in FIG. 19); the extending direction of the connecting line of centers of the camera 33, the receiver 34, the light sensor 35 and the flash lamp 36 may also be arranged in a triangular shape, in a quadrangular shape, or in other shapes. In addition, two light sensors 35 may be provided, one light sensor 35 is disposed on the upper surface 313 of the base 31, and the other light sensor 35 is disposed on the front surface 311. The light sensor 35 disposed on the upper surface 313 can detect, in real time, brightness of the environment where the mobile electronic device 100 is located, and the light sensor 35 disposed on the front surface 311 can detect the brightness of the environment where the mobile electronic device 100 is located when the user answers a call. Certainly, the input-output module 30 may only include any one or more of the receiver 34, the light sensor 35 and the flash lamp 36.

Referring to FIGS. 1-2 and 18, when the input-output module 30 includes the receiver 34, the start tag 22 further includes the call start tag 224, and the drive assembly 40 can drive the input-output module 30 to be exposed from the end portion of the body 10 in accordance with a user input signal for the camera start tag 222 or the call start tag 224. The close tag 26 further includes a call close tag, and the drive assembly 40 can drive the input-output module 30 to hide into the body 10 in accordance with a user input signal for the camera close tag 262 or the call close tag 264.

In some embodiments, the input-output module 30 according to the above embodiments may not be provided with the rotating shaft 32, in which case, the mover of the rotary motor 44 is directly coupled to the base 31 of the input-output module 30 and controls the input-output module 30 to rotate.

Figure 20:
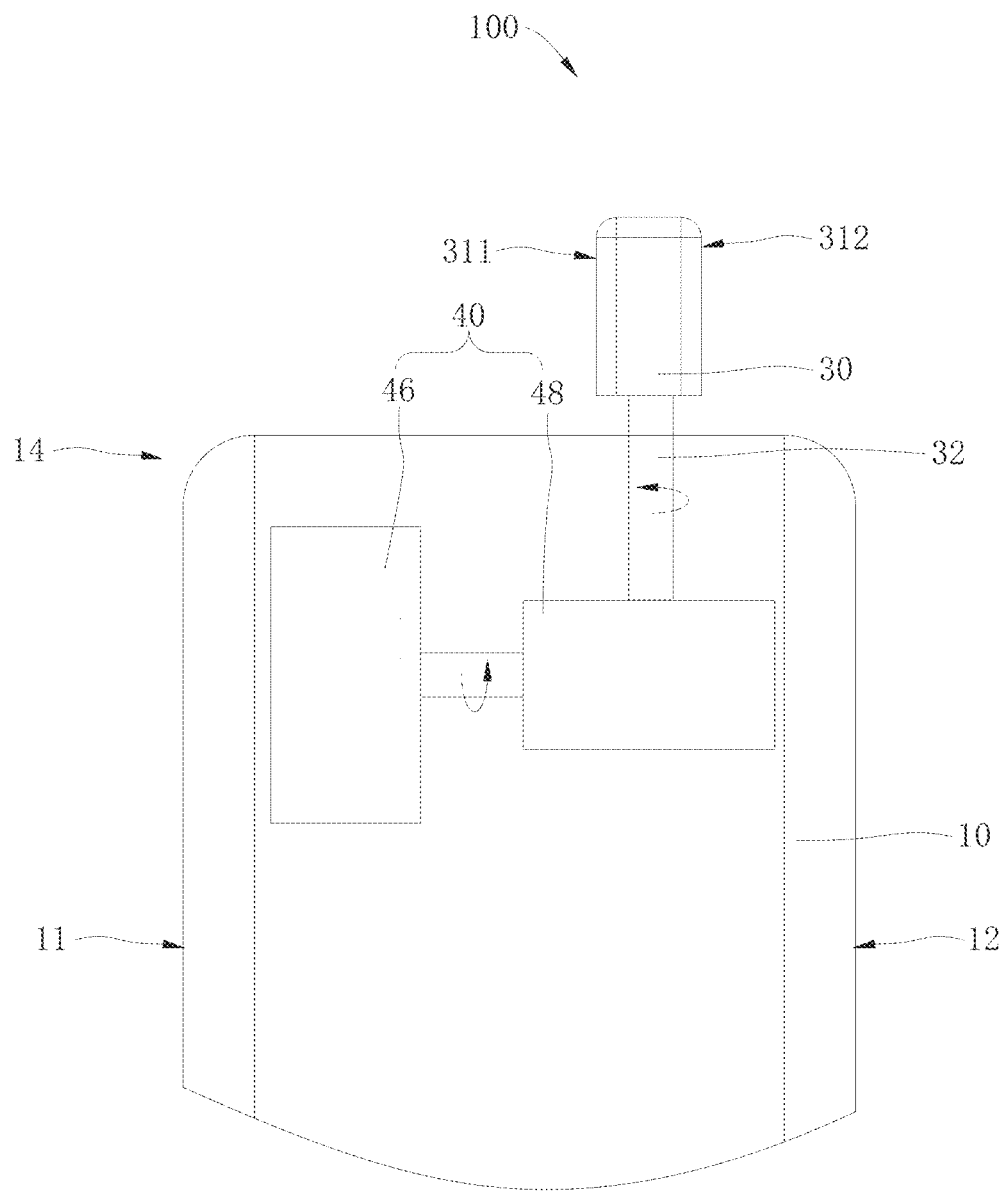
FIGS. 20 to 22 are plan views of a mobile electronic device according to some embodiments of the present disclosure.
Figure 21:
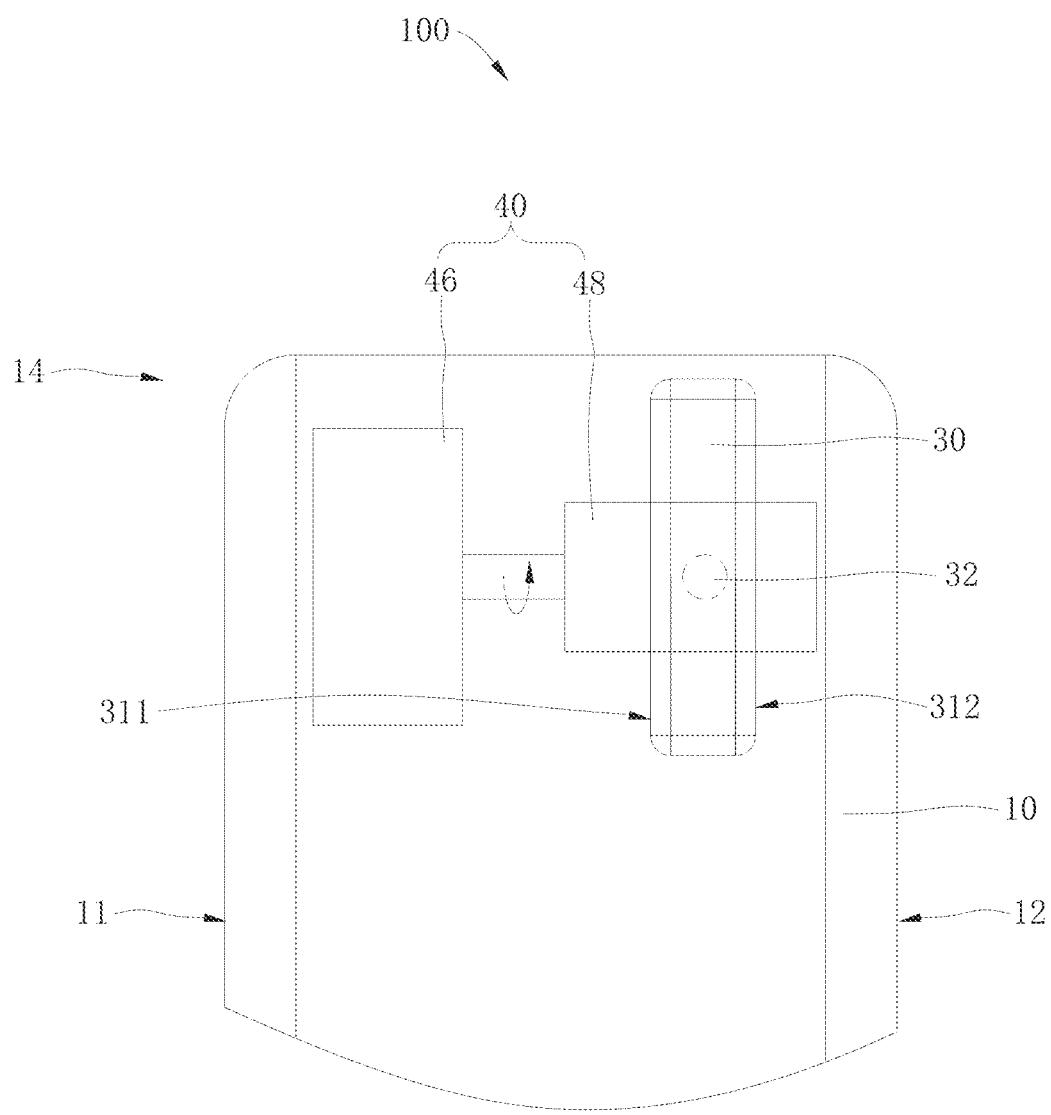
Figure 22:
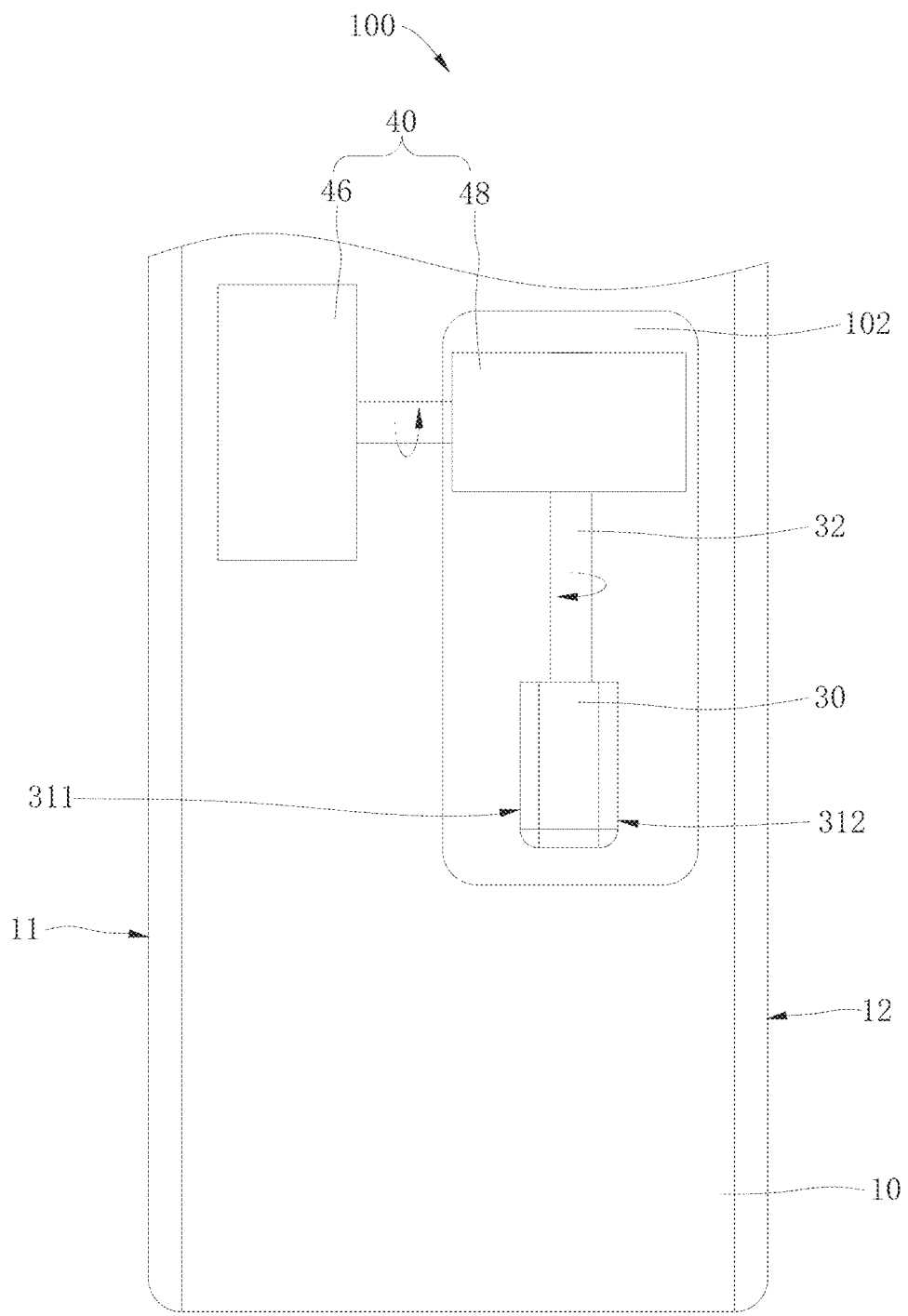

Referring to FIGS. 20 to 22, in some embodiments, the linear driving member 42 and the rotary driving member 44 of the drive assembly 40 according to the above embodiments may be replaced with a first rotary driving member 46 and a second rotary driving member 48. The first rotary driving member 46 may include a rotary motor, and the second rotary driving member may also include a rotary motor. The first rotary driving member 46 is coupled to the second rotary driving member 48, and the second rotary driving member 48 is coupled to the rotating shaft 32. For example, a mover of the first rotary driving member 46 is fixedly coupled to a stator of the second rotary driving member 48, and a mover of the second rotary driving member 48 is fixedly coupled to the rotating shaft 32. The first rotary driving member 46 is configured to control the second rotary driving member 48 to rotate together with the input-output module 30, such that the input-output module 30 is exposed from the end portion 14 of the body 10. The second rotary driving member 48 is configured to drive the rotating shaft 32 to rotate so as to drive the input-output module 30 to rotate, after the input-output module 30 is exposed from the end portion 14 of the body 10. Specifically, the mover of the first rotary driving member 46 rotates to drive the second rotary driving member 48 and the input-output module 30 to rotate until the input-output module 30 is completely exposed from the end portion 14 of the body 10, and then the mover of the second rotary driving member 48 rotates to drive the input-output module 30 to rotate.

The drive assembly 40 (the first rotary driving member 46) can drive the input-output module 30 to rotate in accordance with a user input signal for the camera start tag 222 displayed on the display screen 20, such that the input-output module 30 is exposed from the end portion 14 of the body 10. The drive assembly 40 (the second rotary driving member 48) can drive the rotating shaft 32 to drive the input-output module 30 to rotate by 180 degrees in accordance with a user input signal for the camera switch tag 242, such that the camera 33 can be used as the rear camera. The drive assembly 40 (the second rotary driving member 48) can also drive the rotating shaft 32 to drive the input-output module 30 to rotate continuously in accordance with a user input signal for the panoramic camera tag 244, such that the camera 33 can shoot continuously in a plurality of directions, i.e. the camera 33 can shoot a panoramic photo. The drive assembly 40 (the first rotary driving member 46, or the first rotary driving member 46 and the second rotary driving member 48 together) can drive the input-output module 30 to rotate to hide into the body 10 in accordance with a user input signal for the camera close tag 262.

Referring to FIGS. 1-2 and 18-19, a mobile phone according to embodiments of the present disclosure includes a body 10, a display screen 20 coupled to the body 10, and an input-output module 30 including a base 31, a camera 33 and a receiver 34 with electroacoustic transform function. The camera 33 and the receiver 34 are coupled to the base 31, and the input-output module 30 is movable relative to the body 10 to make the mobile phone transformable between a first configuration and a second configuration. In the first configuration, the receiver 34 and the camera 33 are exposed out of the body 10 and extend beyond the display screen 20, and the camera 33 is rotatable relative to the body 10 to face different directions. In the second configuration, the camera 33 is received in the body 10 and covered by the display screen 20.

In the mobile phone according to embodiments of the present disclosure, by providing the camera 33 and the receiver 34 to the input-output module 30 and making the input-output module 30 movable relative to the body 10, the input-output module 30 is hided in the body 10 when the camera 33 is not used, and is exposed from the body 10 when the camera 33 needs to be used, such that the camera 33 does not occupy space of the display screen 20 on the premise that a shooting function is not influenced, thereby effectively increasing a screen-to-body ratio of the mobile phone.

Figure 23:
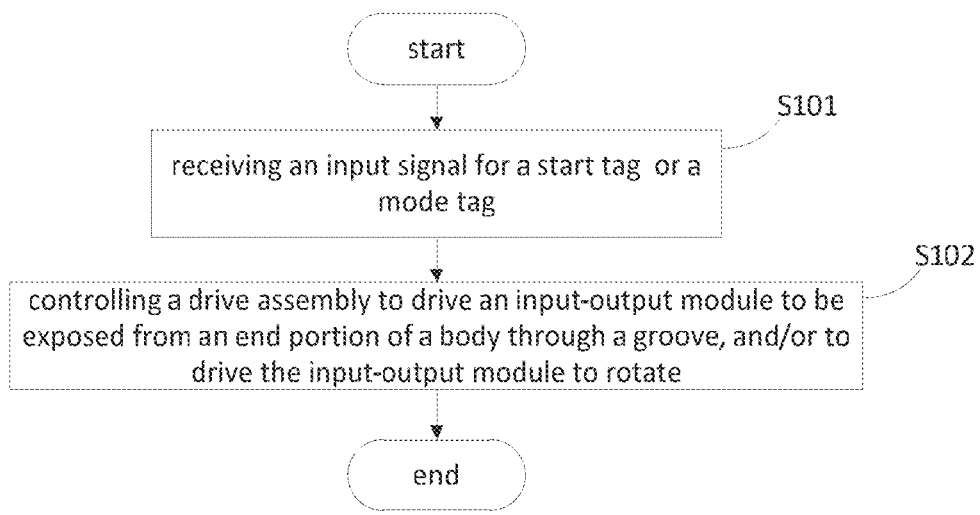
FIG. 23 is a first flow chart illustrating a method for controlling a mobile electronic device according to an embodiment of the present disclosure.

Referring to FIG. 23, a method for controlling a mobile electronic device 100 according to the present disclosure is provided, the mobile electronic device 100 includes a body 10 defining a groove 102 in an end portion 14 thereof, a display screen 20 disposed to an obverse surface 11 of the body 10 and being able to display a start tag 22 and a mode tag 24, an input-output module 30 is including a base 31 and a camera 33 disposed to the base 31 and being able to be at least partially accommodated in the body 10, and a drive assembly 40 coupled to the input-output module 30; and the method includes the actions at the following blocks.

At block S101, an input signal for the start tag 22 or the mode tag 24 is received.

At block S102, the drive assembly 40 is controlled to drive the input-output module 30 to be exposed from the end portion 14 of the body 10 through the groove 102, and/or to drive the input-output module 30 to rotate. It could be understood that the drive assembly 40 can be controlled to only drive the input-output module 30 to be exposed from the end portion 14 of the body 10; or to only drive the input-output module 30 to rotate; or to drive the input-output module 30 to be exposed from the end portion 14 of the body 10 and to drive the input-output module 30 to rotate.

In some embodiment, the drive assembly 40 able to be movably accommodated in the groove 102, the drive assembly 40 is accommodated in the body 10, the drive assembly 40 includes a linear driving member 42 and a rotary driving member 44, the rotary driving member 44 is fixedly coupled to the linear driving member 42 and is fixedly coupled to the input-output module 30, the linear driving member 42 is configured to drive the rotary driving member 44 to move together with the input-output module 30 so as to expose the input-output module 30 from the end portion 14 of the body 10 through the groove 102, and the rotary driving member 44 is configured to drive the input-output module 30 to rotate when the input-output module 30 is exposed from the end portion 14 of the body 10.

In some embodiment, the input-output module 30 is able to be rotatably accommodated in the groove 102, the drive assembly 40 includes a first rotary driving member 46 and a second rotary driving member 48, the first rotary driving member 46 is fixedly coupled to the second rotary driving member 48, the second rotary driving member 48 is coupled to the input-output module 30 and both of the second rotary driving member 48 and the input-output module 30 are accommodated in the groove 102, the first rotary driving member 46 is configured to drive the second rotary driving member 48 to rotate together with the input-output module 30 so as to expose the input-output module 30 from the end portion 14 of the body 10, and the second rotary driving member 48 is configured to drive the input-output module 30 to rotate when the input-output module 30 is exposed from the end portion 14 of the body 10.

Figure 24:
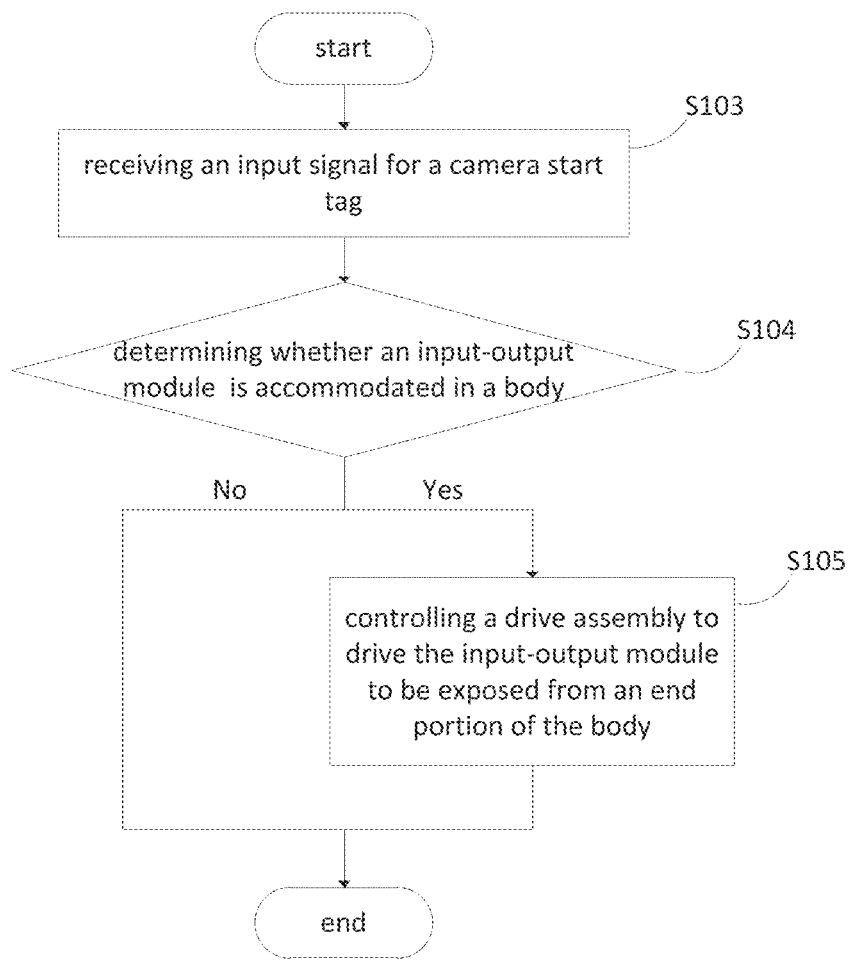
FIG. 24 is a second flow chart illustrating a method for controlling a mobile electronic device according to an embodiment of the present disclosure.

Referring to FIG. 24, in some embodiments, the start tag 22 includes a camera start a 222, and the method includes the actions at the following blocks.

At block S103, an input signal for the camera start tag 222 is received.

At block S104, it is determined whether the input-output module 30 is accommodated in the body 10, and if yes, an action at block S105 is executed.

At block S105, the drive assembly 40 is controlled to drive the input-output module 30 to be exposed from the end portion 14 of the body 10.

Figure 25:
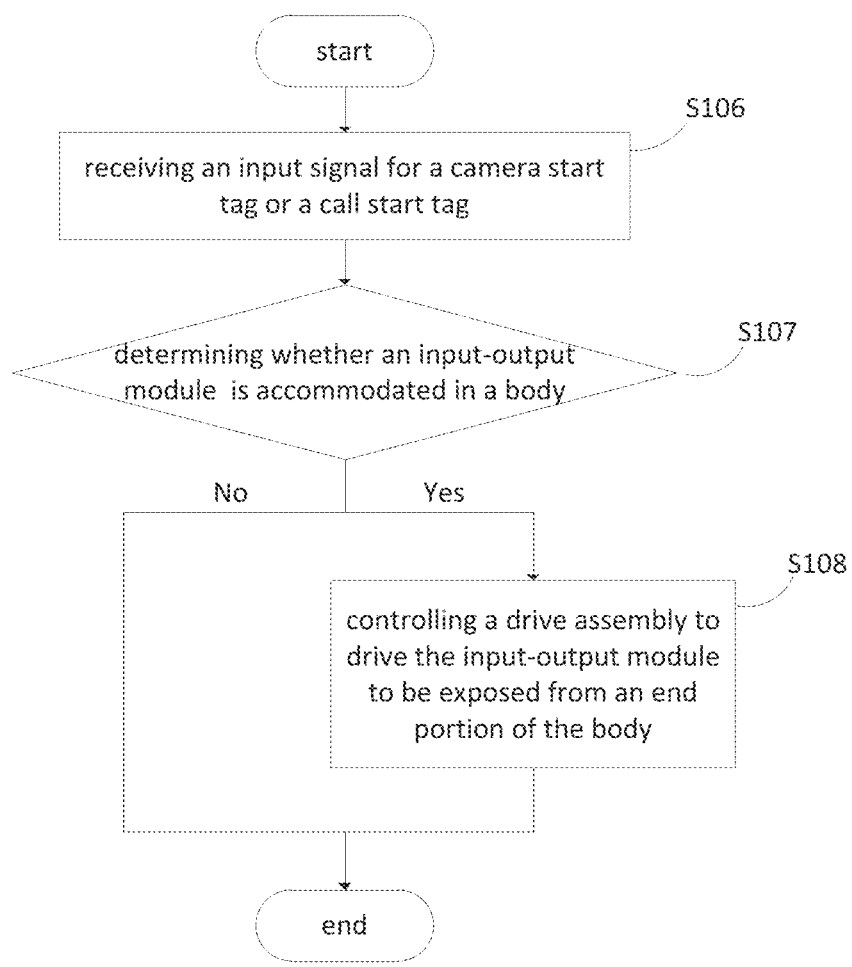
FIG. 25 is a third flow chart illustrating a method for controlling a mobile electronic device according to an embodiment of the present disclosure.

Referring to FIG. 25, in some embodiments, the input-output module 30 includes a receiver 34 disposed to the base 31, and the start tag 22 includes a call start tag 224, and the method includes the actions at the following blocks.

At block S106, an input signal for the camera start tag or the call start tag 224.

At block S107, it is determined whether the input-output module 30 is accommodated in the body 10, and if yes, an action at block S108 is executed.

At block S108, the drive assembly 40 is controlled to drive the input-output module 30 to be exposed from the end portion 14 of the body 10.

Figure 26:
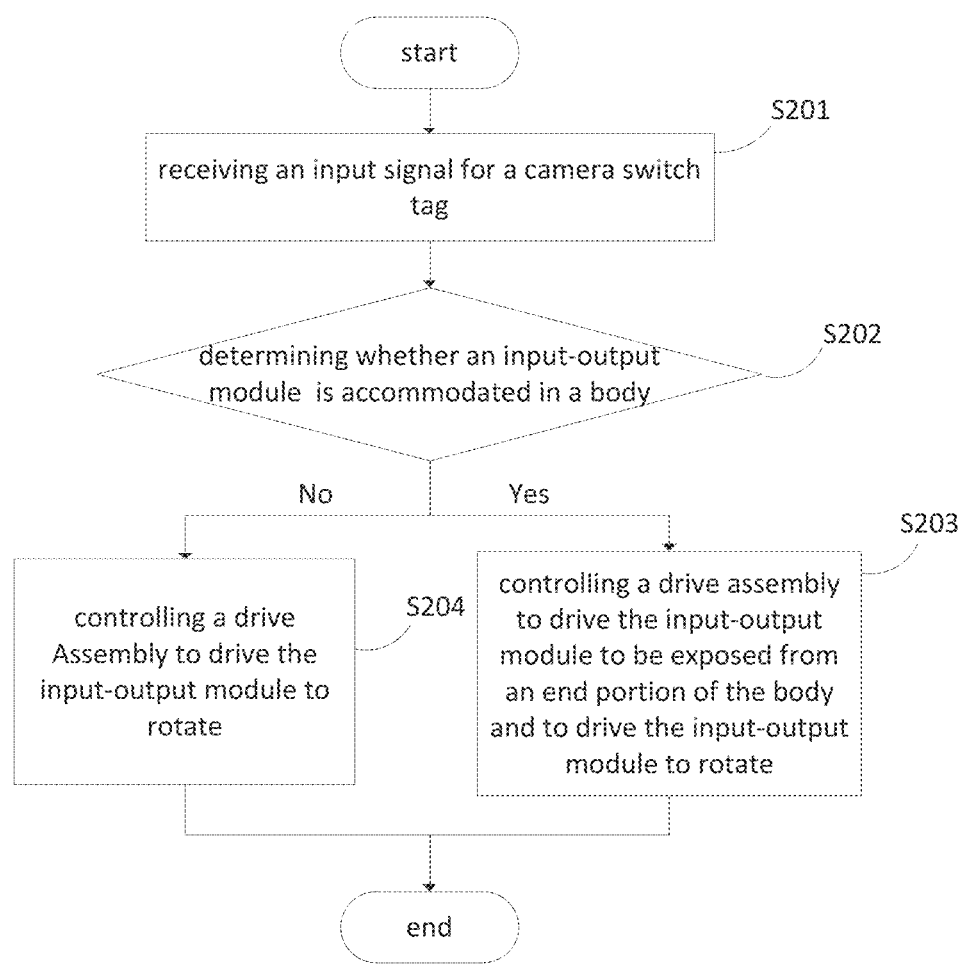
FIG. 26 is a fourth flow chart illustrating a method for controlling a mobile electronic device according to an embodiment of the present disclosure.

Referring to FIG. 26, in some embodiments, the mode tag 24 includes a camera switch tag 242, and the method includes the actions at the following blocks.

At block S201, an input signal for the camera switch tag 242 is received.

At block S202, it is determined whether the input-output module 30 is accommodated in the body 10, if yes, an action at block S203 is executed, and otherwise, an action at block S204 is executed.

At block S203, the drive assembly 40 is controlled to drive the input-output module 30 to be exposed from the end portion 14 of the body 10 and to drive the input-output module 30 to rotate.

At block S204, the drive assembly 40 is controlled to drive the input-output module 30 to rotate.

Figure 27:
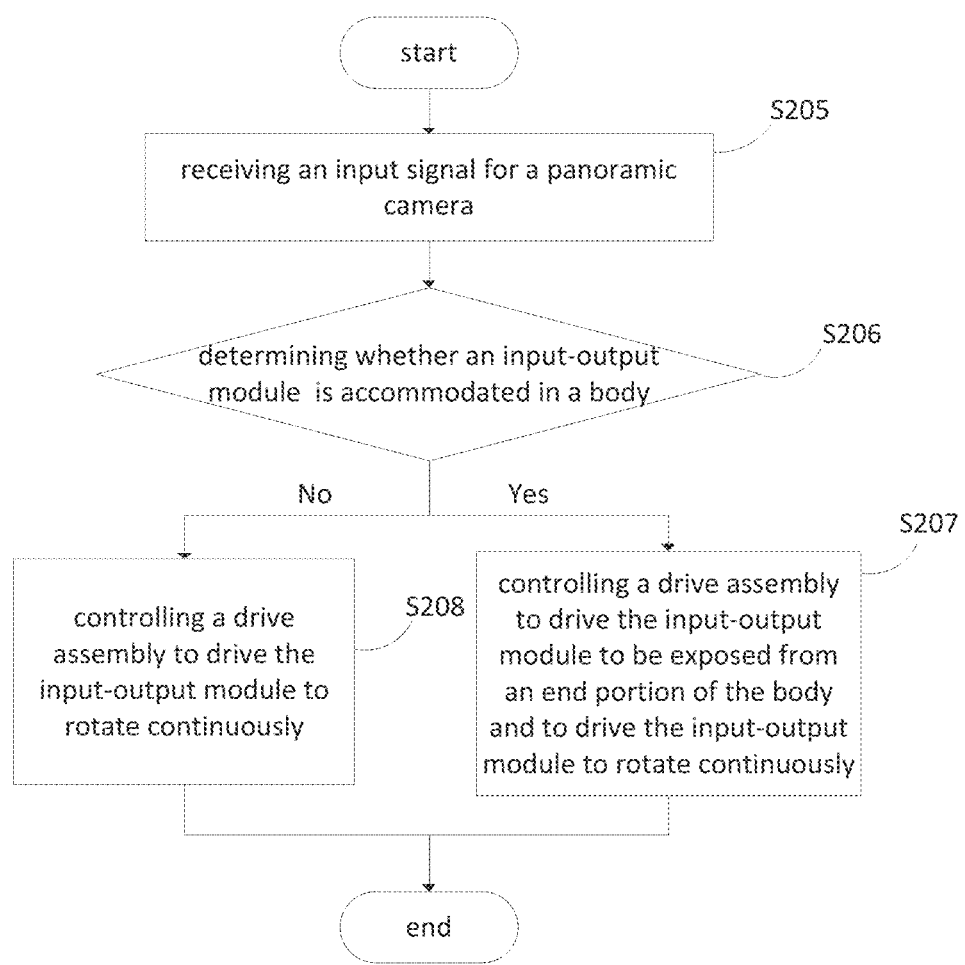
FIG. 27 is a fifth flow chart illustrating a method for controlling a mobile electronic device according to an embodiment of the present disclosure.

Referring to FIG. 27, in some embodiments, the mode tag 24 includes a panoramic camera 244, and the method includes the actions at the following blocks.

At block S205, an input signal for the panoramic camera 244 is received.

At block S206, it is determined whether the input-output module 30 is accommodated in the body 10, if yes, an action at block S207 is executed, and otherwise, an action at block S208 is executed.

At block S207, the drive assembly 40 is controlled to drive the input-output module 30 to be exposed from the end portion 14 of the body 10 and to drive the input-output module 30 to rotate continuously, such that the camera 33 can continuously shoot in a plurality of directions.

At block S208, the drive assembly 40 is controlled to drive the input-output module 30 to rotate continuously, such that the camera 33 can continuously shoot in a plurality of directions.

Figure 28:
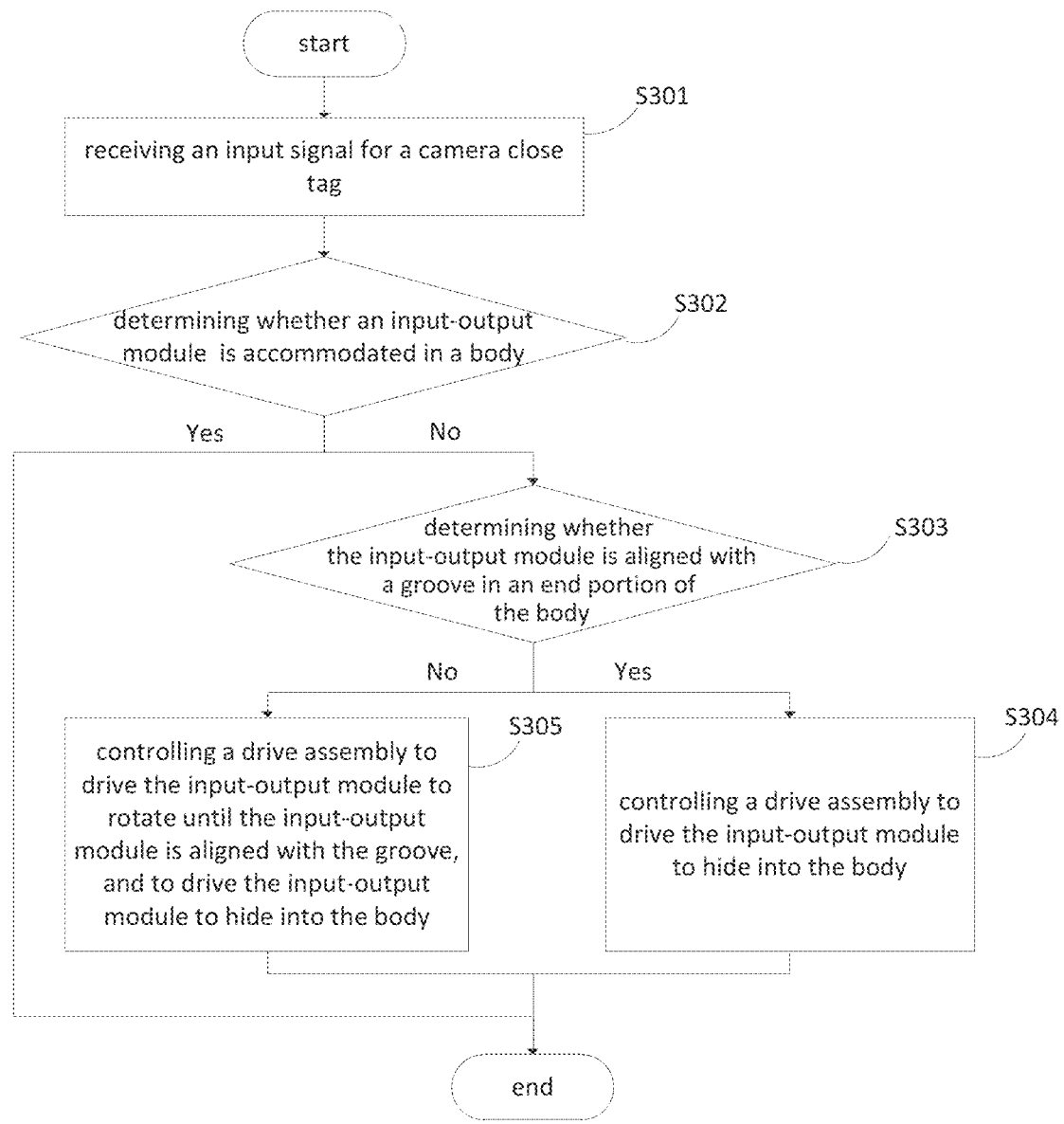
FIG. 28 is a sixth flow chart illustrating a method for controlling a mobile electronic device according to an embodiment of the present disclosure.

Referring to FIG. 28, in some embodiments, the display screen 20 can display a close tag 26 including a camera close tag 262, and the method includes the actions at the following blocks.

At block S301, an input signal for the camera close tag 262 is received.

At block S302, it is determined whether the input-output module 30 is accommodated in the body 10, and if not, an action at block S303 is executed.

At block S303, it is determined whether the input-output module 30 is aligned with the groove 102 in the end portion 14 of the body 10, and if yes, an action at block S304 is executed, otherwise, an action at block 305 is executed.

At block S304, the drive assembly 40 is controlled to drive the input-output module 30 to hide into the body 10.

At block S305, the drive assembly 40 is controlled to drive the input-output module 30 to rotate until the input-output module 30 is aligned with the groove 102, and to drive the input-output module 30 to hide into the body 10.

Figure 29:
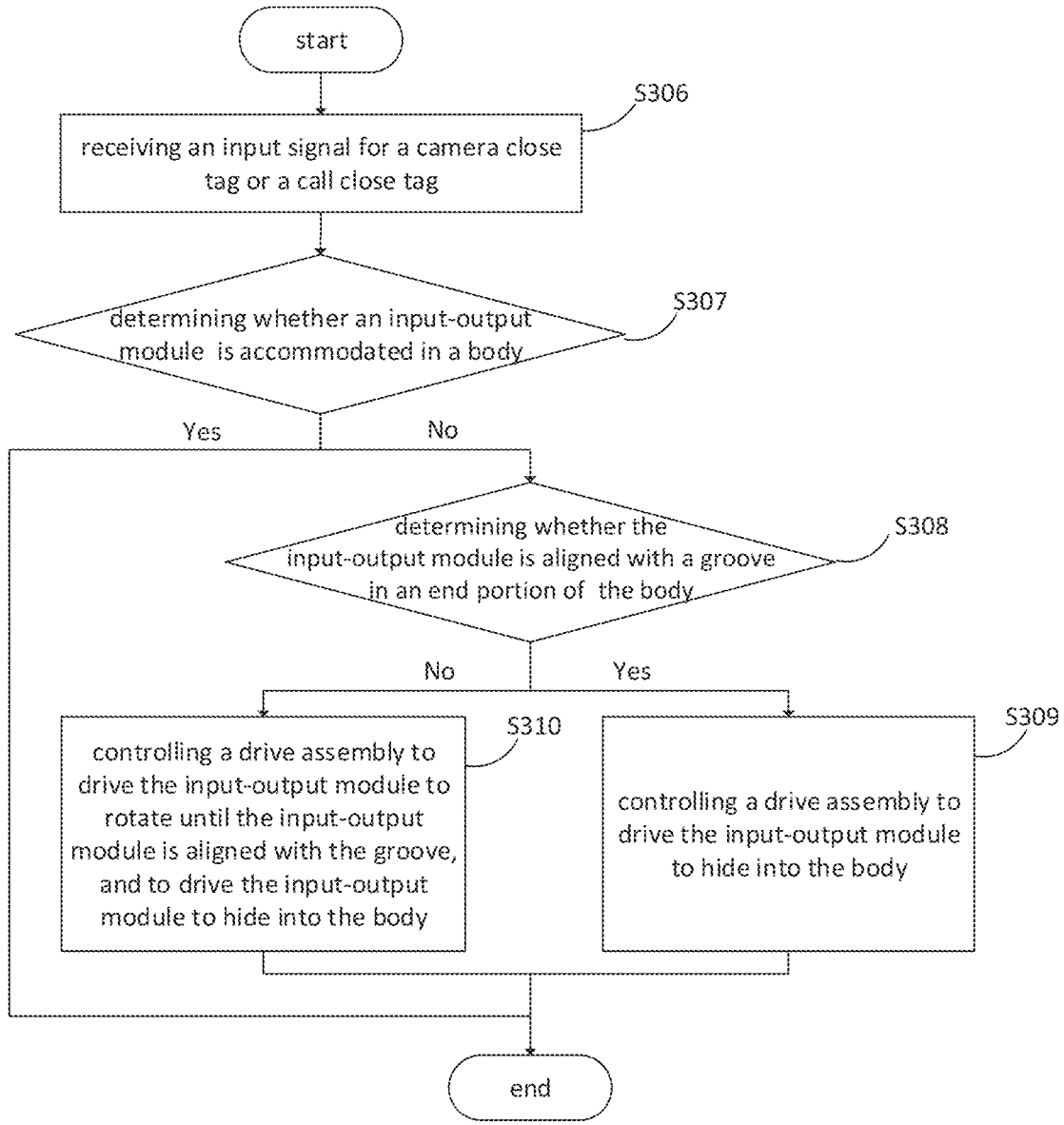
FIG. 29 is a seventh flow chart illustrating a method for controlling a mobile electronic device according to an embodiment of the present disclosure.

Referring to FIG. 29, in some embodiments, the input-output module includes a receiver 34 disposed to the base 31, the close tag 26 includes a call close tag 264, and the method includes actions at the followings At block S306, an input signal for the camera close tag 262 or the call close tag 264 is received.

At block S307, it is determined whether the input-output module 30 is accommodated in the body 10, and if not, an action at block S308 is executed.

At block S308, it is determined whether the input-output module 30 is aligned with the groove 102 in the end portion of the body 10, and if yes, an action at block S309 is executed, otherwise, an action at block 310 is executed.

At block S309, the drive assembly 40 is controlled to drive the input-output module 30 to hide into the body 10.

At block S310, the drive assembly 40 is controlled to drive the input-output module 30 to rotate until the input-output module 30 is aligned with the groove 102, and to drive the input-output module 30 to hide into the body 10.

In the mobile electronic device 100 according to the above-described method, the input-output module 30 is hided in the body 10 when the camera 33 is not used, and the drive assembly 40 is used to control the input-output module 30 to be exposed from the end portion 14 of the body 10 when the camera 33 needs to be used, such that the camera 33 does not occupy the space of the display screen 20 on the premise that the shooting function is not influenced, thereby effectively increasing the screen-to-body ratio of the mobile electronic device 100.

Figure 30:
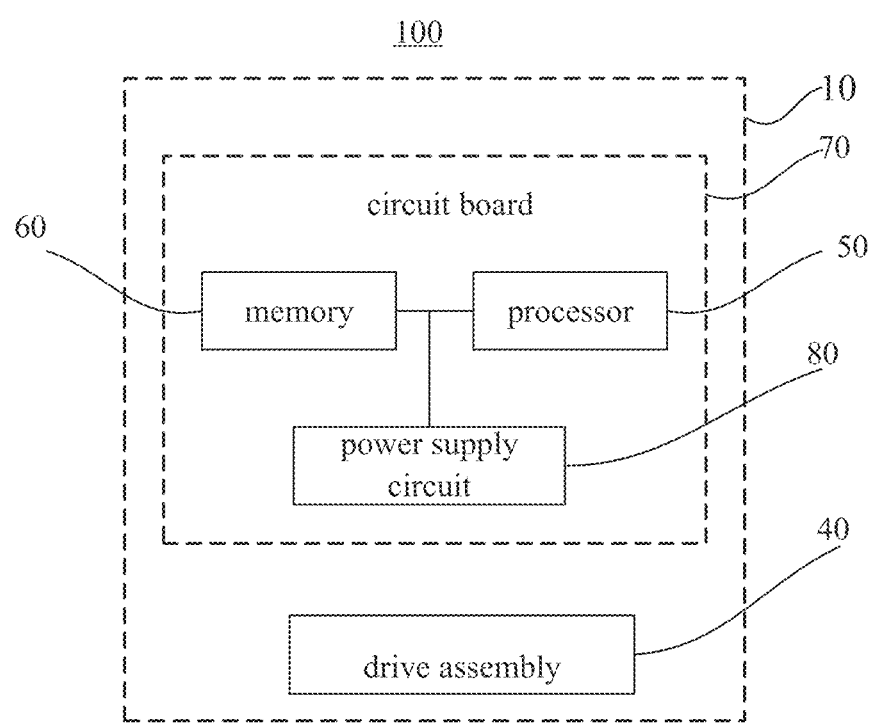
FIG. 30 is a block diagram of a mobile electronic device according to an embodiment of the present disclosure.

Referring to FIG. 30, the mobile electronic device 100 of the present disclosure further includes a processor 50, a memory 60, a circuit board 70, and a power supply circuit 80. The circuit board 70 is enclosed by the body 10. The processor 50 and the memory 60 are positioned on the circuit board 70. The power supply circuit 80 is configured to provide power for respective circuits or components of the mobile electronic device 100. The memory 60 is configured to store executable program codes. The display screen 20 is electrically coupled to the processor 50, and can communicate with the processor 50. The drive assembly is electrically coupled to the processor 50, and configured to execute the command from the processor 50.

The processor 50 is configured to run a program corresponding to the executable program codes by reading the executable program codes stored in the memory 60, to perform following actions: receiving an input signal for the start tag 22 or the mode tag 24; and controlling the drive assembly 40 to drive the input-output module 30 to be exposed from the end portion 14 of the body 10 through the groove 102, and/or to drive the input-output module 30 to rotate.

In some implementations, the processor 50 is configured to run a program corresponding to the executable program codes by reading the executable program codes stored in the memory 60, to perform following actions: receiving an input signal for the camera start tag 222; determining whether the input-output module 30 is accommodated in the body 10; and when the input-output module 30 is accommodated in the body 10, controlling the drive assembly 40 to drive the input-output module 30 to be exposed from the end portion 14 of the body 10.

In some implementations, the processor 50 is configured to run a program corresponding to the executable program codes by reading the executable program codes stored in the memory 60, to perform following actions: receiving an input signal for the camera start tag 222 or the call start tag 224; determining whether the input-output module 30 is accommodated in the body 10; and when the input-output module 30 is accommodated in the body 10, controlling the drive assembly 40 to drive the input-output module 30 to be exposed from the end portion 14 of the body 10.

In some implementations, the processor 50 is configured to run a program corresponding to the executable program codes by reading the executable program codes stored in the memory 60, to perform following actions: receiving an input signal for the camera switch tag 242; determining whether the input-output module 30 is accommodated in the body 10; when the input-output module 30 is accommodated in the body 10, controlling the drive assembly 40 to drive the input-output module 30 to be exposed from the end portion 14 of the body 10 and to drive the input-output module 30 to rotate; and when the input-output module 30 is not accommodated in the body 10, controlling the drive the input-output module 30 to drive the input-output module 30 to rotate.

In some implementations, the processor 50 is configured to run a program corresponding to the executable program codes by reading the executable program codes stored in the memory 60, to perform following actions: receiving an input signal for the panoramic camera 244; determining whether the input-output module 30 is accommodated in the body 10;

when the input-output module 30 is accommodated in the body 10, controlling the drive assembly 40 to drive the input-output module 30 to be exposed from the end portion 14 of the body 10 and to drive the input-output module 30 to rotate continuously; and when the input-output module 30 is not accommodated in the body 10, controlling the drive assembly 40 to drive the input-output module 30 to rotate continuously.

In some implementations, the processor 50 is configured to run a program corresponding to the executable program codes by reading the executable program codes stored in the memory 60, to perform following actions: receiving an input signal for the camera close tag 262; determining whether the input-output module 30 is accommodated in the body 10; when the input-output module 30 is accommodated in the body 10, determining whether the input-output module 30 is aligned with the groove 102 in the end portion 14 of the body 10; when the input-output module 30 is aligned with the groove 102 in the end portion 14 of the body 10, controlling the drive assembly 40 to drive the input-output module 30 to hide into the body 10; and when the input-output module 30 is not aligned with the groove 102 in the end portion 14 of the body 10, controlling the drive assembly 40 to drive the input-output module 30 to rotate until the input-output module 30 is aligned with the groove 102, and to drive the input-output module 30 to hide into the body 10.

In some implementations, the processor 50 is configured to run a program corresponding to the executable program codes by reading the executable program codes stored in the memory 60, to perform following actions: receiving an input signal for the camera close tag 262 or the call close tag 264; determining whether the input-output module 30 is accommodated in the body 10; when the input-output module 30 is accommodated in the body 10, determining whether the input-output module 30 is aligned with the groove 102 in the end portion 14 of the body 10; when the input-output module 30 is aligned with the groove 102 in the end portion 14 of the body 10, controlling the drive assembly 40 to drive the input-output module 30 to hide into the body 10; and when the input-output module 30 is not aligned with the groove 102 in the end portion 14 of the body 10, controlling the drive assembly 40 to drive the input-output module 30 to rotate until the input-output module 30 is aligned with the groove 102, and to drive the input-output module 30 to hide into the body 10.

The embodiment according to the present disclosure may only satisfy one of the above embodiments or may satisfy more than one of the above embodiments at the same time, that is to say, the embodiment obtained by combining one or more of the above embodiments also belongs to the protection scope of the embodiments of the present disclosure.

Reference throughout this specification to "an embodiment," "some embodiments," "an illustrative embodiment" "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more of this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is limited by the claims and its equivalence.

What is claimed is:

1. A mobile electronic device, comprising:
   a body;
   a display screen, disposed to a first surface of the body and being able to display a start tag and a mode tag;
   an input-output module, comprising a base and a camera disposed to the base, and being able to be at least partially accommodated in the body; and
   a drive assembly, coupled to the input-output module, configured to drive the input-output module to be exposed from an end portion of the body in accordance with a user input signal for the start tag, and configured to drive the input-output module to rotate in accordance with a user input for the mode tag;
   wherein the input-output module further comprises a receiver with electroacoustic transform function, a light sensor, and a flash lamp disposed in the base.

2. The mobile electronic device according to claim 1, wherein the end portion of the body defines a groove, the input-output module is able to be movably accommodated in the groove, the drive assembly is accommodated in the body, the drive assembly comprises a linear driving member and a rotary driving member, the rotary driving member is fixedly coupled to the linear driving member and is fixedly coupled to the input-output module, the linear driving member is configured to drive the rotary driving member to move together with the input-output module so as to expose the input-output module from the end portion of the body through the groove, and the rotary driving member is configured to drive the input-output module to rotate when the input-output module is exposed from the end portion of the body.

3. The mobile electronic device according to claim 1, wherein the end portion of the body defines a groove penetrating a second surface of the body, the input-output module is able to be rotatably accommodated in the groove, the drive assembly comprises a first rotary driving member and a second rotary driving member, the first rotary driving member is fixedly coupled to the second rotary driving member, the second rotary driving member is coupled to the input-output module and both of the second rotary driving member and the input-output module are accommodated in the groove, the first rotary driving member is configured to drive the second rotary driving member to rotate together with the input-output module so as to expose the input-output module from the end portion of the body, and the second rotary driving member is configured to drive the input-output module to rotate when the input-output module is exposed from the end portion of the body.

4. The mobile electronic device according to claim 1, wherein the start tag comprises a call start tag and a camera start tag, and the drive assembly is configured to drive the input-output module to be exposed from the end portion of the body in accordance with a user input signal for the camera start tag or the call start tag.

5. The mobile electronic device according to claim 1, wherein the mode tag comprises a camera switch tag, and the drive assembly is configured to drive the input-output module to rotate in accordance with a user input signal for the camera switch tag after the input-output module is exposed from the end portion of the body.

6. The mobile electronic device according to claim 1, wherein the mode tag comprises a panoramic camera tag, and the drive assembly is configured to drive the input-output module to rotate continuously in accordance with a user input signal for the panoramic camera tag after the input-output module is exposed from the end portion of the body, such that the camera can continuously shoot in a plurality of directions.

7. The mobile electronic device according to claim 1, wherein the mode tag comprises a camera switch tag, and the drive assembly is configured to drive the input-output module to be exposed from the end portion of the body, and also configured to drive the input-output module to rotate, in accordance with a user input signal for the camera switch tag.

8. The mobile electronic device according to claim 1, wherein the mode tag comprises a panoramic camera tag, and the drive assembly is configured to drive the input-output module to be exposed from the end portion of the body, and control the input-output module to rotate continuously in accordance with a user input signal for the panoramic camera tag, such that the camera can continuously shoot in a plurality of directions.

9. The mobile electronic device according to claim 1, wherein the display screen is able to display a close tag, the close tag comprises a camera close tag, and the drive assembly is configured to drive the input-output module to hide into the body in accordance with a user input signal for the camera close tag.

10. The mobile electronic device according to claim 9, wherein
    the close tag comprises a call close tag, and the drive assembly is configured to drive the input-output module to hide into the body in accordance with a user input signal for the camera close tag or the call close tag.

11. The mobile electronic device according to claim 1, wherein the display screen is able to display a camera close tag, and the drive assembly is also configured to drive the input-output module to rotate, and control the input-output module to hide into the body in accordance with a user input signal for the camera close tag.

12. The mobile electronic device according to claim 1, wherein the mode tag comprises a manual control tag, and the drive assembly is configured to drive the input-output module to rotate at any angle in accordance with a user input signal for the manual control tag, such that the camera can shoot pictures in a plurality of directions.

13. The mobile electronic device according to claim 1, wherein the base comprises a front surface and an upper surface; and the light sensor comprises a first light sensor disposed on the upper surface and a second light sensor disposed on the front surface.

14. A mobile electronic device, comprising:
a body, defining a groove in an end portion thereof;
an input-output module, comprising a base, a rotating shaft disposed to the base, and a camera disposed to the base, and being able to be at least partially accommodated in the body; and
a drive assembly, located in the body, coupled to the input-output module, and configured to drive the input-output module to be exposed from the end portion of the body through the groove, and configured to drive the rotating shaft to drive the input-output module to rotate;
wherein the input-output module further comprises a receiver with electroacoustic transform function, a light sensor, and a flash lamp disposed in the base.

15. The mobile electronic device according to claim 14, wherein the drive assembly comprises a linear motor and a rotary motor; a mover of the linear motor is fixedly coupled to a stator of the rotary motor, and a mover of the rotary motor is fixedly coupled to the rotating shaft; the linear motor is configured to control the rotary motor to move linearly together with the input-output module, such that the input-output module is exposed from the end portion of the body, and the rotary motor is configured to drive the rotating shaft to rotate so as to drive the input-output module to rotate, after the input-output module is exposed from the end portion of the body.

16. The mobile electronic device according to claim 14, wherein the body comprises an obverse surface, a back surface opposite to the obverse surface, and a top surface coupling the obverse surface and the back surface; the base comprises a front surface, a rear surface, an upper surface and a lower surface that are opposite each other correspondingly; the front surface and the obverse surface face the same side of the body, the rear surface and the back surface face the same other side of the body, the upper surface and the top surface face the same side of the body, and the lower surface faces away from the upper surface.

17. The mobile electronic device according to claim 16, wherein the rotating shaft is disposed to the lower surface of the base, and the camera is located at the front surface of the base or located at the rear surface of the base.

18. The mobile electronic device according to claim 16, wherein the groove is located at a center position of the top surface, or the groove penetrates a side edge intersecting the back surface with the top surface.

19. The mobile electronic device according to claim 16, further comprise a display screen disposed to the obverse surface of the body and being able to display a start tag and a mode tag, wherein the first drive member is configured to drive the input-output module to be exposed from the end portion of the body through the groove in accordance with a user input signal for the start tag, and the second drive member is configured to drive the input-output module to rotate in accordance with a user input for the mode tag.

20. A mobile phone comprising:
a body;
a display screen coupled to the body; and
an input-output module, comprising a base, a camera, a receiver with electroacoustic transform function, a light sensor, and a flash lamp, the camera, the receiver, the light sensor and the flash lamp being coupled to the base, the input-output module being movable relative to the body to make the mobile phone transformable between a first configuration and a second configuration, in the first configuration, the receiver and the camera being exposed out of the body and extending beyond the display screen, and the camera being rotatable relative to the body to face different directions, in the second configuration, the camera being received in the body and covered by the display screen.

* * * * *